United States Patent [19]

Yoshida et al.

[11] Patent Number: 5,085,496
[45] Date of Patent: Feb. 4, 1992

[54] OPTICAL ELEMENT AND OPTICAL PICKUP DEVICE COMPRISING IT

[75] Inventors: Yoshio Yoshida; Takahiro Miyake; Yasuo Nakata; Yukio Kurata; Nobuo Ogata, all of Tenri; Tetsuo Ueyama, Nara; Hideaki Sato, Yamatokoriyama, all of Japan

[73] Assignee: Sharp Kabushiki Kaisha, Osaka, Japan

[21] Appl. No.: 500,292

[22] Filed: Mar. 28, 1990

[30] Foreign Application Priority Data

| Mar. 31, 1989 | [JP] | Japan | 1-81707 |
| Jun. 9, 1989 | [JP] | Japan | 1-148100 |
| Sep. 8, 1989 | [JP] | Japan | 1-234204 |
| Nov. 8, 1989 | [JP] | Japan | 1-290710 |
| Nov. 15, 1989 | [JP] | Japan | 1-298105 |

[51] Int. Cl.$^5$ ............... G02B 5/18; G02B 5/30
[52] U.S. Cl. ............... 359/569; 360/114; 369/109; 369/110; 359/485
[58] Field of Search ............ 350/102.2, 381, 384, 350/385; 360/114; 369/109, 110

[56] References Cited

U.S. PATENT DOCUMENTS

| 4,885,734 | 12/1989 | Yuzo | 350/162.2 |
| 4,945,527 | 7/1990 | Sunagawa | 369/44.21 |

*Primary Examiner*—Bruce Y. Arnold
*Assistant Examiner*—J. P. Ryan

[57] ABSTRACT

An optical element comprises a polarization diffraction element that is provided with diffraction gratings that are respectively mounted on different faces of a transparent substrate of a flat plate shape, which grating pitches are equal to each other and approximately equal to the wavelength of an incident light, and which grating lines are parallel. The thickness of the substrate is set such that the difference that occurs between the phases of the P and S polarizations of a light due to the grating, and the difference that occurs between the phases of the two polarizations when the light propagates through the substrate cancel out. The optical pickup device comprising the optical element includes a polarized light detecting unit provided with a diffraction grating which grating pitch is approximately equal to the wavelength of an incident light; a first photodetector that is mounted integrally and virtually in parallel with the substrate, and that receives a zero-order diffracted light produced by the diffraction grating; and a second photodetector that is located in the same plane as the first photodetector and mounted integrally with the first photodetector and the substrate, and that receives a first-order diffracted light produced by the diffraction grating.

30 Claims, 24 Drawing Sheets

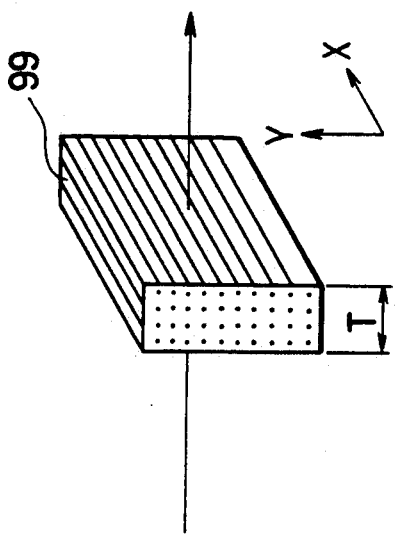
FIG. 38
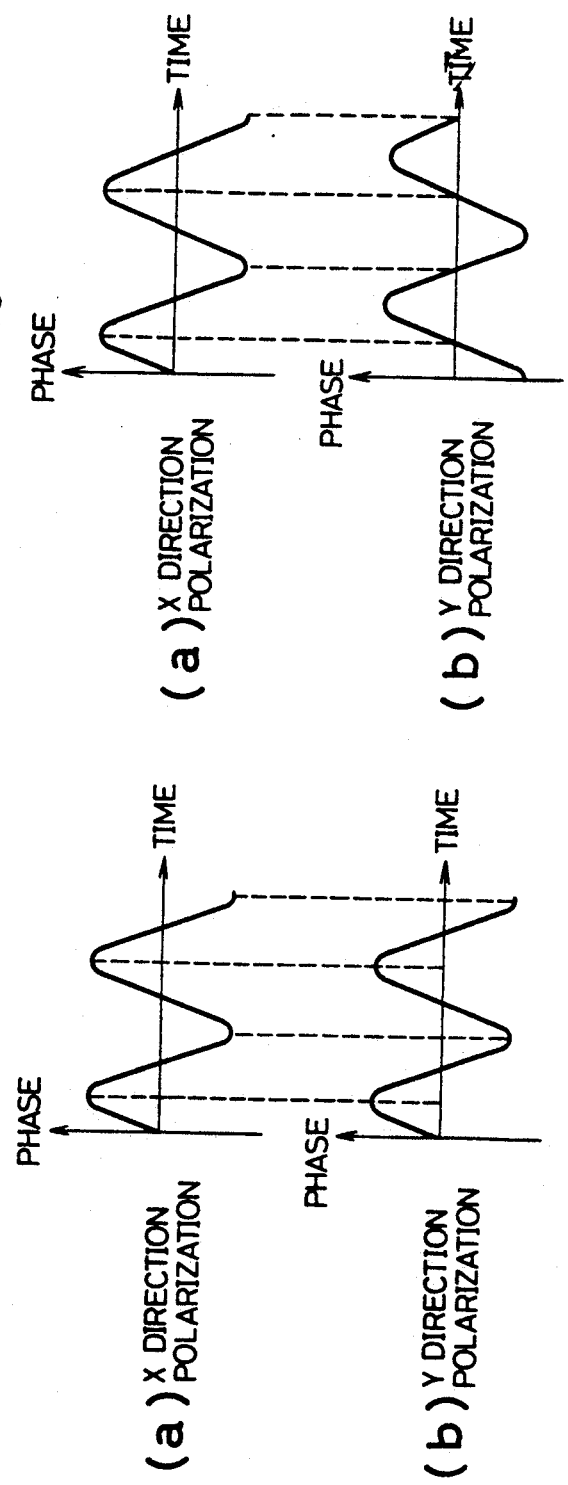
FIG. 40
FIG. 39

OPTICAL ELEMENT AND OPTICAL PICKUP DEVICE COMPRISING IT

FIELD OF THE INVENTION

The present invention relates to an optical element to be used as a polarization diffraction element, phase shifting element, antireflection element or the like, in optical pickup devices and other devices. The present invention also relates to an optical pickup device provided with the aforementioned optical element.

BACKGROUND OF THE INVENTION

In recent years, the development of a magneto-optical memory element having a high capacity and storage density, and capable of recording and/or erasing repeatedly, has been actively pursued. This type of magneto-optical memory element is usually composed by a magnetic thin film formed on a substrate. The magnetic thin film is provided with an axis of easy magnetization perpendicular to the surface of the film, and is magnetized in either direction through initialization.

During recording, a relatively strong laser beam is irradiated on the magnetic thin film, while applying an external magnetic field of a direction opposite to the direction of the external magnetic field which was applied during the initialization. In the part irradiated, the temperature rises causing the coercive force to lower. As a result, the magnetization is inverted in the direction of the external magnetic field.

During reproduction, a relatively weak laser beam is irradiated on the magnetic thin film. The plane of polarization of the light reflected from the magnetic thin film is rotated in accordance with the direction of magnetization through the magneto-optical effect. Information signals can be thus detected by detecting the inclination of the plane of polarization.

An example of a conventional optical pickup device adapted for a magneto-optical memory element is illustrated in FIG. 26.

A linearly polarized laser beam projected from a semiconductor laser 51, is converted into a parallel beam of light by a collimating lens 52, passes through a compound beam splitter 53 and is converged on a magneto-optical memory element 56 across a mirror 54 and an objective lens 55.

The plane of polarization of the reflected light from the magneto-optical memory element 56 is rotated in accordance with the direction of magnetization at the time of the reflection. The reflected light is then led across the objective lens 55 and the mirror 54 to the compound beam splitter 53 where it is reflected in direction at a right angles to the incidence direction of the reflected light by a face 53a. A portion of the reflected light is further reflected in a direction at right angles to the incidence direction of the reflected light by a face 53b, passes through a spot lens 57 and a cylindrical lens 58, and impinges upon a photodetector 60 of a four-quadrant type. In the photodetector 60, a tracking error signal and a focus error signal are generated based on the widely known push-pull method and astigmatic method respectively.

Meanwhile, the light that was transmitted through the face 53b of the compound beam splitter 53 is reflected in a direction at a right angle with the incidence direction of the transmitted light by a face 53c, and its plane of polarization is rotated by 45° by a half-wave plate 59. This light is then split into two polarized lights having mutually orthogonal polarizations by a polarizing beam splitter 61, and the two polarized lights impinge on the photodetector 62 and the photodetector 63 respectively. Information on the magneto-optical memory element 56 is reproduced based on the output signals of the photodetectors 62 and 63.

In the magneto-optical memory element 56, the detection of information signals is generally performed by making use of the Kerr effect.

In FIG. 27, suppose that the laser beam irradiated on the magneto-optical memory element 56 is, as shown by I, a linearly polarized light of a P polarization only. When the direction of magnetization in the part of the magneto-optical memory element 56 that was illuminated by the laser beam, coincides with the upward direction in FIG. 26, the plane of polarization of the reflected light is rotated by $(+\epsilon_k)$, as shown by II in FIG. 27. On the other hand, when the direction of magnetization in the part that was illuminated by the laser beam, coincides with the downward direction in FIG. 26, the plane of polarization of the reflected light is rotated by $(-\epsilon_k)$ as shown by III in FIG. 27. Accordingly, information on the magneto-optical memory element 56 can be reproduced by detecting the rotation of the plane of polarization by means of the photodetectors 62 and 63.

However, the Kerr angle of rotation $\epsilon_k$ is generally an extremely small angle of 0.5° to 1.5°. The Kerr angle of rotation $\epsilon_k$ needs thus to be given a bigger more easily detectable appearance in order to obtain a reproduction signal of a high quality.

Hence, in the optical pickup device shown in FIG. 26, the angle $\epsilon_k$ is made bigger in appearance by giving a polarization property to the face 53a or 53b of the compound beam splitter 53.

For example, the face 53b may be designed such that the transmittance $T_P$ for the P polarization is set at 30% and the reflectance $R_P$ is set at 70%, and the transmittance $T_S$ for the S polarization is set at 100% and the reflectance $R_S$ is set at 0%. As a result, as illustrated in FIG. 28, the P polarization that passed through the face 53b is reduced to 30%, while the S polarization is not reduced. The apparent Kerr angle of rotation $\epsilon_k'$ is thus increased and equals approximately 1.0° to 2.7°.

However, the use of the compound beam splitter 53, the polarizing beam splitter 61 and other members in the optical pickup device shown in FIG. 26, causes the number of parts as well as the weight of the device to increase, and as the weight of the device increases it correspondingly causes the access time to be slow.

Another example of an optical pickup device adapted for the magneto-optical memory element 56 is illustrated in FIG. 29. The composing members common to the optical pickup device of FIG. 26 and the optical pickup device of FIG. 29 are designated by the same reference numerals.

A laser beam is projected from a semiconductor laser 51, passes through a Kerr angle of rotation multiplier prism 64, is converted into a parallel beam of light by a collimating lens 52, and is converged on the magneto-optical memory element 56 across an objective lens 55.

The reflected light from the magneto-optical memory element 56 passes through the objective lens 55 and the collimating lens 52. A portion of the reflected light is further reflected in a direction at right angles to the incidence direction of the reflected light by the Kerr angle of rotation multiplier prism 64. The reflected light then passes successively through a half-wave plate 59, a cylindrical lens 58 and a concave lens 65, and impinges upon a polarizing beam splitter 66.

In the polarizing beam splitter 66, the reflected light from the magneto-optical memory element 56 is split into two polarized lights having mutually orthogonal polarizations. One of the polarized lights is transmitted through the polarizing beam splitter 66 and impinges on a photodetector 60 of a four-quadrant type. A focus error signal and a tracking error signal are then generated by following the same process as in the photodetector 60 of FIG. 26.

As to the other polarized light, it is reflected at right angles by the polarizing beam splitter 66 and impinges upon a photodetector 67. Information on the magneto-optical memory element 56 is reproduced by performing the operation of the signal that was released by the photodetector 67 and the signal produced by summing the signals released by the different photodetection sections of the photodetector 60, and amplifying the result of the operation.

In the optical pickup device of FIG. 29, the separation of the reflected light from the magneto-optical memory element 56 is performed by the polarizing beam splitter 66. However, for manufacturing reasons, it is difficult to fabricate the polarizing beam splitter 66 so that each side measures approximately less than 2 mm, thereby causing the polarizing beam splitter 66 to be large and heavy. A similar difficulty arises with the Kerr angle of rotation multiplier prism 64. In addition, the optical pickup device suffers from a drawback as its access speed when it moves to a desired radial position on the magneto-optical memory element 56, lowers because of the weight increase due to the Kerr angle of rotation multiplier prism 64 and the polarizing beam splitter 66.

Further, another example of optical pickup device adapted for the magneto-optical memory element 56 is illustrated in FIG. 30.

A laser beam is projected from a semiconductor laser 51, converged on the magneto-optical memory element 56 across a collimating lens 52, a first prism section 68a of a Kerr angle of rotation multiplier compound prism 68 and an objective lens 55. The reflected light from the magneto-optical memory element 56 is led to the first prism section 68a of the Kerr angle of rotation multiplier compound prism 68 across the objective lens 55. A portion of the reflected light is reflected in a direction at right angles to the incidence direction of the reflected light by the first prism section 68a and is further separated into a transmitted light and a reflected light by a second prism section 68b.

The light that was transmitted through the second prism section 68b impinges upon a Wollaston prism 70 across a half-wave plate 59 and a convex lens 69. The transmitted light is split by the Wollaston prism 70 into two polarized lights which impinge respectively upon the different photodetection sections of a photodetector 71 of a two-divisions type. Information on the magneto-optical memory element 56 is reproduced by performing the operation of the signals that were generated based on the two polarized lights detected on the different photodetection sections, and amplifying the result of the operation.

On the other hand, the reflected light that was reflected in a direction at right angles to the incidence direction of the reflected light, by the second prism section 68b of the Kerr angle of rotation multiplier compound prism 68, impinges upon a photodetector 60 of a four-quadrant type across a convex lens 72 and a cylindrical lens 58. A focus error signal and a tracking error signal are then generated based on the signals released by the photodetector 60.

However, with the optical pickup device of FIG. 30 also, it is difficult to form the Wollaston prism 70 so that each side measures approximately less than 2 mm. Further, as the Kerr angle of rotation multiplier compound prism 68 is of a large size also, this causes the whole optical pickup device to be large and heavy. Moreover, as the Wollaston prism 70 and other parts are made of a crystalline material, the cost of the optical pickup device is high.

A birefringent wedge 73 may be used instead of the Wollaston prism 70 in the optical pickup device of FIG. 30 (see FIG. 31). However, the deflection angle between the two polarizations P and S obtained with the birefringent wedge 73 equals for example 2.06°, which is smaller than the deflection angle equal to 4.6° obtained with the Wollaston prism 70. The birefringent wedge 73 is thus more disadvantageous than the Wollaston prism 70 in terms of size of the device.

As described above, when, in order to split the reflected light from the magneto-optical memory element 56, using the polarizing beam splitters 61 and 66, the Wollaston prism 70 and the birefringent wedge 73, or mounting the compound beam splitter 53 or the Kerr angle of rotation multiplier prism 64 between the semiconductor laser 51 and the magneto-optical memory element 56, the consequence of a large and heavy optical pickup device cannot be avoided.

Hence, recent experiments have used a diffraction element having a desired polarization property as a means for cutting down the number of parts and reducing the weight of the optical pickup device. A diffraction element having the desired polarization property will be discussed hereinafter.

In the conventional art, a diffraction grating which grating pitch is formed approximately equal to a predesignated wavelength of the light is known to have a particular polarization property (K. Yokomori, "Dielectric surface-relief gratings with high diffraction efficiency," Applied Optics Vol. 23, No. 14, pp 2303, 1984).

As illustrated in FIG. 32, a polarization diffraction element 81 is composed of a diffraction grating 83 formed on one side of a transparent substrate 82 made of glass or other material according to the two beam interference method or other method. The diffraction grating 83 has a polarization property and its grating pitch is formed approximately equal the wavelength of the light it is designed for. The diffraction grating 83 is made of, for example, photoresist and its thickness and grating pitch are respectively set at 1 $\mu$m and 0.5 $\mu$m. The diffraction grating 83 is fabricated so that a P polarization is transmitted at virtually 100%, and a S polarization is diffracted at virtually 100%.

When an incident light 84 with a wavelength of for example 0.8 $\mu$m impinges upon the polarization diffraction element 81 at a Bragg angle, the P polarization of the incident light 84 is transmitted through the diffraction grating 83 to produce a zeroth-order diffracted light 84a while it is virtually not diffracted and produce virtually no first-order diffracted light 84b. On the other hand, the S polarization of the incident light 84 is diffracted by the diffraction grating 83 to produce a first-order diffracted light 84b but is virtually not transmitted and produces virtually no zeroth-order diffracted light 84a.

In order to detect the zeroth-order diffracted light 84a and the first-order diffracted light 84b after they are separated as described above, the zeroth-order diffracted light 84a is converged on a photodetector 87 across a converging lens 85 and the first-order diffracted light 84b is converged on a photodetector 88 across a converging lens 86.

As described above, the diffraction grating 83 has the property of splitting light of different polarizations. The polarization diffraction element 81 that comprises the diffraction grating 83 may be thus employed as a polarizing beam splitter in an optical pickup device used in a magneto-optical recording and reproducing apparatus. By using the polarization diffraction element 81 as a polarizing beam splitter, the number of parts may be reduced and the optical pickup device can be made compact and light.

An example of an optical pickup device provided with a polarization diffraction element such as described above is illustrated in FIG. 33. The composing members common to the optical pickup device of FIG. 26 and the optical pickup device of FIG. 33, are designated by the same reference numerals.

In FIG. 33, a linearly polarized laser beam that was projected from a semiconductor laser 51 is irradiated on the magneto-optical memory element 56 across a collimating lens 52, a beam splitter 74, a mirror 54 and an objective lens 55.

The reflected light whose plane of polarization was rotated on the magneto-optical memory element 56 in accordance with a recording signal, reaches the beam splitter 74 across the objective lens 55 and the mirror 54. The reflected light is reflected in a direction at a right angle with the incidence direction of the reflected light by the beam splitter 74, and impinges upon a polarization diffraction element 77 across a half-wave plate 75 and a converging lens 76 thereafter.

The polarization diffraction element 77, as illustrated in FIG. 34, is for example divided into four areas in order to generate a servo signal. Diffraction gratings 77a, 77b, 77c and 77d are respectively mounted on each of the areas. The grating pitch of each of the diffraction gratings 77a, 77b, 77c and 77d, is approximately equal to the wavelength of the laser light it is designed for.

A zeroth-order diffracted light that was transmitted through the polarization diffraction element 77 is split into two polarized lights by a birefringent wedge 78. Information on the magneto-optical memory element 56 is reproduced as the two polarized lights impinge on the different photodetection sections of a photodetector 79 of a two-divisions type.

Meanwhile, a first-order diffracted light that was diffracted by the polarization diffraction element 77 impinges upon a photodetector 80 of a multi-divisions type. A tracking error signal and a focus error signal are then generated by performing the operation of the output signals released by the different photodetection sections of the photodetector 80.

In the polarization diffraction element 77, the Kerr angle of rotation may be made bigger in appearance for example by setting the zeroth-order diffraction efficiency at 30% and the first-order diffraction efficiency at 70% for the P polarization, and setting the zeroth-order diffraction efficiency at 100% and the first-order diffraction efficiency at 0% for the S polarization.

Moreover, an optical pickup device such as the one illustrated in FIG. 35, may be fabricated for example by employing diffraction gratings instead of the Kerr angle of rotation multiplier prism 64 and the polarized beam splitter 66 of FIG. 29.

In the optical pickup device of FIG. 35, a linearly polarized laser beam $L_1$ is projected from a semiconductor laser 89. The light $L_1$ is split by a diffraction grating 90a formed on a substrate 90b in a diffraction element 90, to produce a zeroth-order diffracted light $L_{20}$ and a first-order diffracted light $L_{21}$ that is diffracted at an angle of diffraction $\beta_1$. The first-order diffracted light $L_{21}$ is then irradiated on a magneto-optical memory element 91 provided with a recording film 91b made of a magnetic thin film, and with a substrate 91a.

The first-order diffracted light $L_{21}$ is irradiated on the recording film 91b and is reflected after its plane of polarization is rotated through the magneto-optical effect. The reflected light $L_3$ is split by the diffraction grating 90a to produce a zeroth-order diffracted light $L_{40}$ that is transmitted light, and a first-order diffracted light $L_{41}$ that returns toward the semiconductor laser 89. The plane of polarization of the zeroth-order diffracted light $L_{40}$ is rotated by 45° by a half-wave plate 92 and the zeroth-order diffracted light $L_{40}$ impinges upon a diffraction grating 93a formed on a substrate 93b in a diffraction element 93 thereafter. The zeroth-order diffracted light $L_{40}$ is split to produce a zeroth-order diffracted light $L_{50}$ that is transmitted, and a first-order diffracted light $L_{51}$ that is diffracted at an angle of diffraction $\beta_1$. The zeroth-order diffracted light $L_{50}$ and the first-order diffracted light $L_{51}$ are respectively received by the photodetectors 94 and 95. Information on the magneto-optical memory element 91 is reproduced by amplifying the output signals of the photodetectors 94 and 95 in a differential amplifier 96. When necessary, convex lenses 97 and 98 may be placed between the diffraction grating 93 and the photodetectors 94 and 95, as illustrated in FIG. 36.

FIG. 37 shows a graph illustrating the diffraction efficiency of the two mutually orthogonal polarizations for the zeroth-order diffracted light $L_{40}$ and the first-order diffracted light $L_{41}$ produced by the diffraction grating 90a, as a function of the groove depth of the grating. In FIG. 37, it is supposed that in the optical pickup device, the grating pitch of the diffraction grating 90a equals $0.59\alpha$ (where $\alpha$ is the wavelength of the relative laser light), and the index of refraction of the substrate 90b equals 1.45. Here, $L_{40}$(TE) represents the polarization in the zeroth-order diffracted light $L_{40}$, whose polarization is parallel with the grating lines of the diffraction grating 90a (the direction perpendicular to the paper surface in FIG. 35), and $L_{41}$(TE) represents the polarization in the first-order diffracted light $L_{41}$, whose direction is parallel with the grating lines of the diffraction grating 90a. Similarly, $L_{40}$(TM) represents the polarization in the zeroth-order diffracted light $L_{40}$ which direction is perpendicular to the grating lines of the diffraction grating 90a, and $L_{41}$(TM) represents the polarization in the first-order diffracted light $L_{41}$ whose direction is perpendicular to the grating lines of the diffraction grating 90a.

As it is clearly shown in the figure, the ratio of the diffraction efficiency of $L_{40}$(TM):the diffraction efficiency of $L_{41}$(TM) almost equals 100:0 while the ratio of the diffraction efficiency of $L_{40}$(TE):the diffraction efficiency of $L_{41}$(TE) varies in accordance with the groove depth of the diffraction grating 90a.

In the conventional pickup device illustrated in FIG. 29, the P polarization (corresponding to the above TE polarization) of the reflected light from the magneto-optical memory element 56 is transmitted through and reflected on the Kerr angle of rotation multiplier prism 64 with a ratio set to about 70:30. Meanwhile the S polarization (corresponding to the above TM polarization) of the reflected light from the magneto-optical memory element 56 is transmitted through and reflected on the Kerr angle of rotation multiplier prism 64 with a ratio set to almost 0:100. Accordingly, characteristics almost equivalent the characteristics of the conventional Kerr angle of rotation multiplier prism 64 can be created in the diffraction grating 90a of FIG. 35 by setting $L_{40}(TE):L_{41}(TE)\approx 30:70$, and $L_{40}(TM):L_{41}(TM)\approx 100:0$. As it is clearly shown in FIG. 37, the groove depth satisfying these conditions is approximately equal to $0.77\alpha$. While with the Kerr angle of rotation multiplier prism 64 of FIG. 29, information signals are detected through the reflected light, with the diffraction grating 90a of FIG. 35, information signals are detected through the zeroth-order diffracted light $L_{40}$ (transmitted light). The diffraction grating 90a is thus designed such that the TM polarization of the reflected light from the magneto-optical memory element 91 is transmitted at virtually 100%.

In addition, the diffraction element 93 is for example composed of a diffraction grating 93a of the same pitch and of the same direction as the diffraction grating 90a, formed on a substrate 93b of the same index of refraction as the substrate 90b. In order to give a polarization property to the diffraction grating 93a, its groove depth is set at approximately $1.2\alpha$. As a result, for the TE polarization that is parallel to the grating lines, $L_{50}(TE):L_{51}(TE)\approx 0:100$, while for the TM polarization that is perpendicular to the grating lines, $L_{50}(TM):L_{51}(TM)\approx 100:0$. Consequently, with the diffraction grating 93a, the zeroth-order diffracted light $L_{50}$ is almost composed entirely of a TM polarization while the first-order diffracted light $L_{51}$ is almost entirely composed of a TE polarization. Moreover, as the zeroth-order diffracted light $L_{40}$ is rotated by 45° by the half-plate 92 located short of the diffraction element 93, the axis serving as a reference for the separation of the polarized lights produced by the diffraction grating 93a, is rotated by 45° with respect to the linearly polarized light projected from the semiconductor laser 89.

However, in the conventional polarization diffraction element 81 shown in FIG. 32, the diffraction angle of the light diffracted by the diffraction grating 83 is dependant on the wavelength of the incident light 84. For example when a laser diode is used as a light source, the wavelength of the light projected from the laser diode changes in accordance with the variation in the ambient temperature thereby causing the aforementioned diffraction angle to vary.

For instance, when the wavelength of the incident light 84 equals a predetermined wavelength, the first-order diffracted light 84b is diffracted at a predetermined diffraction angle and is converged accurately on the photodetector 88 by the converging lens 86. At this time, if the ambient temperature lowers and the wavelength of the incident light 84 becomes shorter than the predetermined wavelength, the diffraction angle will consequently become smaller causing the first-order diffracted light 84b that was diffracted by the diffraction grating 83 to deviate greatly off the predetermined optical path as shown by the chain double-dashed line in the figure. This gives rise to the inconvenience that the first-order diffracted light 84b cannot be converged on the prescribed position on the photodetector 88 and that the detection of the S polarization cannot be performed.

As described above, in the polarization diffraction element 81, the grating pitch of the diffraction grating 83 is set so as to be approximately equal to the wavelength. As a result, a slight change in the wavelength of the laser light of the incident light 84 causes the diffraction angle to vary greatly and causes the optical path of the first-order diffracted light 84b to deviate. The first-order diffracted light 84b that deviates off the optical path can be received by making the light receiving portion of the photodetector 88 bigger. However, this represents a disadvantageous factor when aiming at producing an optical pickup device that is compact and light, as the optical pickup device gets large when the polarization diffraction element 81 is incorporated therein together with the photodetector 88. Besides, even if the photodetector 88 is made bigger, difficulties arise as the focus of the first-order diffracted light 84b is not formed at a constant position on the photodetector 88 because of variations in the wavelength of the incident light 84 thereby causing a decline in the accuracy of the detection of the S polarization.

Further, as the diffraction angle of the first-order diffracted light 84b equals approximately 100°, the first-order diffracted light 84b and the zeroth-order diffracted light 84a travel at a great distance from each other. The photodetectors 87 and 88 have thus to be mounted in distant positions.

The same difficulties arise with the optical pickup device shown in FIG. 33 and FIG. 35. For instance in FIG. 35, the diffraction angle $\beta_1$ of the diffraction grating 93a is quite big and equals approximately 100° to 120°. The photodetectors 94 and 95 thus need to formed independently and positioned in different directions. In addition, when a variation occurs in the wavelength of the laser beam projected from the semiconductor laser 89, the focal position of the first-order diffracted light $L_{51}$ on the photodetector 95 shifts and in extreme cases slips off the photodetector 95 as shown in FIG. 36, whereby the detection of information signals cannot be performed. Consequently, like in the aforementioned case, it is difficult to produce an optical pickup device that is compact and light. Furthermore, setting the relative positions of the diffraction grating 93a and the photodetectors 94 and 95 is difficult.

The diffraction grating 83 of FIG. 32 is fabricated so that the P polarization is transmitted at virtually 100%, and the S polarization is diffracted at virtually 100%. Suppose a diffraction efficiency $\delta_{0P}$ represents the diffraction efficiency when the P polarization is transmitted to produce the zeroth-order diffracted light 84a, and a diffraction efficiency $\delta_{1S}$ represents the diffraction efficiency when the S polarization is diffracted to produce the first-order diffracted light 84b. In practice, when the incident light 84 impinges upon the single diffraction grating 83, the diffraction efficiency $\delta_{0P}$ and the diffraction efficiency $\delta_{1S}$ are both equal to approximately 0.99. Consequently, the zeroth-order diffracted light 84a that passed through the diffraction grating 83, contains a small amount of S polarization that was transmitted through the diffraction grating 83 with a diffraction efficiency $\delta_{0S}$ equal to approximately 0.01. Similarly, the first-order diffracted light 84b that was diffracted by the diffraction grating 83, contains a small amount of P polarization that was diffracted by the diffraction grating 83 with a diffraction efficiency $\delta_{1P}$ equal to approximately 0.01.

Accordingly, when splitting the incident light 84 by means of the single diffraction grating 83, the ratio of the diffraction efficiency $\delta_{0S}$ to the diffraction efficiency $\delta_{0P}$ shows the proportion of other polarizations contained in the desired polarization, i.e. the degree of polarization, for the zeroth-order diffracted light 84a. Similarly, the ratio of the diffraction efficiency $\delta_{1P}$ to the diffraction efficiency $\delta_{1S}$ shows the degree of polarization for the first-order diffracted light 84b. Consequently, when determining the degree of polarization of the zeroth-order diffracted light and of the first-order diffracted light, both are found to be equal to about 0.01. Therefore the degree of separation of the P polarization and S polarization is not of a level sufficient for practical use.

Moreover, in the optical pickup device shown in FIG. 33, a difference resulting from the polarization property of the diffraction grating 77a, 77b, 77c or 77d of FIG. 34, occurs between the phases of the P polarization and S polarization contained in the zeroth-order diffracted light produced by the polarization diffraction element 77. The zeroth-order diffracted light that was transmitted through the polarization diffraction element 77, thus become an elliptically polarized light thereby causing a decline in the quality of the reproduction signal.

As the above phase difference is due to the polarization property of the polarization diffraction element 77, it cannot be suppressed by optimizing the design of the polarization diffraction element 77. The phase difference can be compensated for instance, by inserting a phase compensating plate, not shown, between the polarization diffraction element 77 and the birefringent wedge 78. However this causes the number of parts to increase. The optical pickup device shown in FIG. 35 also presents a similar problem.

Phase shifting elements and antireflection elements are fundamental optical elements used in optical devices such as the optical pickup devices described above.

A phase shifting element controls the phase difference of two polarizations of mutually orthogonal polarizations, and in the conventional art is fabricated by using a crystalline body. FIG. 38 illustrates a conventional example.

A phase shifting element 99 is made of a crystalline plate of a thickness T, for example a quartz plate, and is mounted so that its optical axis is parallel to an axis X. For example, a system may include a quartz plate designed for a particular light having has a wavelength of 780 nm. The index of refraction $n_1$ for a X direction polarization whose electric field component is parallel with the optical axis is $n_1 = 1.48$. And the index of refraction $n_2$ for a Y direction polarization whose electric field component is orthogonal to the optical axis is $n_2 = 1.52$.

Accordingly, by adjusting the thickness T of the phase shifting element 99, a linearly polarized light $E_1$ which X direction polarization phase and Y direction polarization phase are equal, as shown in FIG. 39(a) and FIG. 39(b), may be converted when passing through the phase shifting element 99 into a circularly or elliptically polarized light $E_2$ which Y direction polarization phase lags behind the X direction polarization phase by, for example, about 90°, as shown in FIG. 40(a) and FIG. 40(b). A specimen of a linearly polarized light is shown in FIG. 41(a) and a specimen of circularly or elliptically polarized light is shown in FIG. 41(b).

On the other hand, in the conventional art, reflection on the surface of an optical member is prevented by forming an antireflection coating on the surface of the optical member. FIG. 42 shows an example of antireflection coating.

On the surface of an optical member 100, there is applied by deposition an antireflection coating 101 made of a dielectric material of an index of refraction slightly smaller than the index of refraction of the optical member 100, for example of MgF (index of refraction n = 1.36). The antireflection coating 101 should be made of a material with an index of refraction $n = \sqrt{n_o}$, where $n_o$ is the index of refraction of the optical member 100, and should have a thickness T' such that $mT' = \alpha/4$ (m = 0; 1, 2 ...) where $\alpha$ is the wavelength of the light the antireflection coating 101 is designed for.

However, as the phase shifting element 99 is composed by a crystalline body, it has the disadvantage that its cost is generally expensive and that the direction of its crystal axis needs to be taken in account during its manufacturing process. In addition, as the adjustment of the thickness T is performed by polishing, polishing and measuring need to be performed repeatedly, causing the process to be time consuming. Moreover, the only method of incorporating the phase shifting element 99 into another optical part is to form the phase shifting element 99 separately and to affix it thereafter. The fabrication as well as the operation of affixing the phase shifting element 99 are thus extremely complex.

Moreover, the material selected for forming the conventional antireflection coating 101 needs to be a dielectric material which index of refraction n is equal to the square root of the index of refraction $n_o$ of the optical member 100. Consequently, difficulties arise when such a dielectric material does not exist, as the antireflection coating 101 has to be formed by multiple layers using a plurality of dielectric materials.

SUMMARY OF THE INVENTION

An object of the present invention is to provide an optical element to be used as a polarization diffraction element capable of detecting a first-order diffracted light at a predetermined position on a photodetector independently of variations in the wavelength of the incident light.

Another object of the present invention is to provide an optical element to be used as a polarization diffraction element that enhances the degree of separation of polarizations by reducing the degree of polarization of the zeroth-order diffracted light and of the first-order diffracted light, and thus improving the accuracy in the detection of the polarized lights.

Another object of the present invention is to provide an optical element to be used as a polarization diffraction element whereby photodetectors for detecting polarized lights, i.e. the zeroth-order diffracted light and the first-order diffracted light, can be installed in proximity.

Still another object of the present invention is to provide an optical element to be used as a polarization diffraction element or a polarization diffraction unit capable of compensating a difference that occurs between the phases of different polarizations in a diffraction grating.

Yet another object of the present invention is to provide an optical pickup device that comprises a polarization diffraction element or a polarization diffraction unit capable of compensating the difference that occurs between the phases of different polarizations in a diffraction grating.

Still another object of the present invention is to provide an optical element to be used as a phase shifting element that is simple, can be manufactured economically and in which a linear grating merely needs to be installed on a face of a transparent substrate.

Further another object of the present invention is to provide an optical element to be used as an antireflection element that is simple, can be manufactured economically, that can be adapted to substrates of any index of refraction, and in which a linear grating merely needs to be installed on a face of a transparent substrate.

Yet another object of the present invention is to provide an optical pickup device of an overall compact size and in which the number of parts is reduced.

Still another object of the present invention is to provide an optical pickup device provided with a polarized light detecting unit whereby the relative positions of a diffraction grating and of first and second photodetectors can be determined accurately.

Yet another object of the present invention is to provide an optical pickup device provided with a polarized light detecting unit whereby a first-order diffracted light does not slip off a second photodetector even when the angle of diffraction varied because of a fluctuation in the wavelength of the incident light due to a change in the temperature or other reason, and whereby the detection performed by the second photodetector is reliable.

Further another object of the present invention is to provide an optical pickup device that is compact, light, and capable of accessing accurately a magneto-optical recording medium.

Yet another object of the present invention is to provide an optical pickup device that performs the detection of recording signals based on the Kerr angle of rotation with high accuracy, and in which recording signals of high quality can be obtained.

In order to achieve the aforementioned objects, an optical element in accordance with the present invention comprises a linear grating which grating pitch is approximately equal to the wavelength of the light the linear grating is designed for, and that is formed on a transparent base of a flat plate shape.

Suppose the index of refraction of the base is n, the wavelength of the concerned light is $\alpha$, and the grating pitch of the linear grating is A; n, $\alpha$ and A should preferably satisfy $A \leq \alpha/n$.

In addition, the cross section of the linear grating may be formed by recessions and protrusions.

In this case, the cross section of the linear grating may be for example a rectangular profile or a sinusoidal wave profile.

With the arrangement described above, an optical element having a function for shifting a phase and other functions, may be formed easily and inexpensively with no need of a costly and delicate material such as a crystalline body, by merely forming a linear grating on a face of a transparent base.

This optical element may be for example used as a phase shifting element. In this case, the relative phase difference of a polarization whose direction is parallel with the direction of the linear grating, and a polarization whose direction is orthogonal to the direction of the linear grating, is controlled in the linear grating portion of the optical element. The phase difference may be controlled to a desired value by for example adjusting the groove depth of the linear grating. Besides, in this case the base should preferably be made of glass or of transparent plastic.

The inventor of the present invention realized that forming a linear grating on a face of a transparent base, enhances the transmittance. As a result the optical element can also be used as an antireflection element. In this case too, the transmittance may be controlled to a suitable value by adjusting the groove depth of the linear grating. When the optical element is used as an antireflection element, the linear grating can be formed on, and thus incorporated in the optical member one wants to be prevented from reflection. By incorporating the antireflection element in the desired optical member in the manner described above, the structure of the optical member may be simplified and its fabrication process facilitated.

Further, the optical element is characterized in comprising a polarization diffraction element provided with a substrate made of a material having an optical anisotropy property, and a diffraction grating made of the aforementioned linear grating. Another characteristic of the optical element is that the thickness of the substrate is set such that the difference between the phases of the P polarization and S polarization of the diffracted light produced by the diffraction grating, and the difference between the phases of the P polarization and the S polarization occuring when the diffracted light propagates through the substrate, cancel out.

The substrate should preferably be formed by an uniaxial crystal that is provided with a single optical axis.

As uniaxial crystal, for instance, quartz may be used.

In this case, the diffraction grating should be formed so as to be parallel with the optical axis of the substrate.

The diffraction grating may be formed by grooves made on the substrate.

The diffraction grating may also be of a refractive index modulation type which is formed such that the indexes of refraction of the diffraction grating and of the remaining portion of the substrate differ.

With the arrangement described above, the substrate of the polarization diffraction element is made of a material having an optical anisotropy property. As a result, when a zeroth-order diffracted light or a first-order diffracted light propagates through the substrate, a phase difference occurs between its P polarization and its S polarization. The phase difference varies in accordance with the distance of propagation through the substrate. Accordingly, in the polarization diffraction element, for example when the phase difference between the P and the S polarizations of the zeroth-order diffracted light needs to be eliminated, the phase difference between the P and the S polarizations of the zeroth-order diffracted light occurring in the diffraction grating can be compensated by adjusting the thickness of the substrate. Namely, the thickness of the substrate should be set such that the phase difference occurring between the different polarizations of the zeroth-order diffracted light due to the optical anisotropy property of the substrate, and the phase difference occurring between the different polarizations of the zeroth-order diffracted light due to the polarization property of the diffraction grating, cancel out.

Similarly, when the phase difference between the P and S polarizations of the first-order diffracted light needs to be eliminated, the thickness of the substrate should be set such that the phase difference between the different polarizations of the first-order diffracted light occurring due to the optical anisotropy property of the substrate, and the phase difference between the different polarizations of the first-order diffracted light occurring due to the polarization property of the diffraction grating, cancel out.

In order to give a polarization property to the diffraction grating, the grating pitch should be set so as to be approximately equal to the wavelength of the diffracted light.

If the substrate is made of an uniaxial crystal, and the diffraction grating designed so as to be parallel with the optical axis of the substrate, even when the light that impinged upon the polarization diffraction element is refracted or diffracted, the polarization direction of the light with respect to the optical axis does not vary. The design of the polarization diffraction element is thus facilitated, and a maximum polarization anisotropy can be obtained. As a result, the thickness of the substrate needed for compensating the phase difference between the P polarization and the S polarization occurring in the diffraction grating, can be reduced.

The present invention is also characterized in that, in an optical pickup device provided with a light source, an optical system for guiding a light beam projected from the light source onto a magneto-optical recording medium and leading the light reflected therefrom to a photodetector, and the photodetector for detecting the recording signals of the magneto-optical recording medium based on the Kerr angle of rotation, the aforementioned polarization diffraction element is mounted in the optical path of the reflected light extending from the magneto-optical recording medium to the photodetector.

The optical pickup device for magneto-optical recording medium in accordance with the present invention, comprises a polarization diffraction element which is the aforementioned optical element in accordance with the present invention. As a result, when detecting recording signals based on the Kerr angle of rotation, if the detection of the Kerr angle of rotation is performed based on the zeroth-order diffracted light produced by the polarization diffraction element, the thickness of the substrate of the polarization diffraction element should be determined so that no phase difference occurs between the P polarization and the S polarization of the zeroth-order diffracted light. The zeroth-order diffracted light that was transmitted through the polarization diffraction element is thus a linearly polarized light whereby the recording signals can be detected accurately.

When detecting the Kerr angle of rotation based on the first-order diffracted light produced by the polarization diffraction element, the thickness of the substrate of the polarization diffraction element should be determined so that no phase difference occurs between the P polarization and the S polarization of the first-order diffracted light.

Further, an optical element in accordance with the present invention comprises a polarization diffraction element provided with a first diffraction grating and a second diffraction grating, each having a grating pitch approximately equal to the wavelength of an incident light, and each being mounted on a different side of a transparent substrate of a flat plate shape. The first diffraction grating and the second diffraction grating are formed such that their respective spacing gratings are equal, and such that their respective grating lines are parallel.

With the aforementioned arrangement, when an incident light of a given wavelength impinges upon the polarization diffraction element, a zeroth-order diffracted light which is the portion of the incident light that was transmitted through the first diffraction grating, is further transmitted through the second diffraction grating. Meanwhile, a first-order diffracted light which is the portion of the incident light that was diffracted by the first diffraction grating, impinges upon the second diffraction grating where it is further diffracted. The incident light is thus split into different polarized lights.

Generally, the angle of diffraction of a diffracted light is determined in accordance with the grating pitch of the diffraction grating, and the wavelength of the incident light. Therefore, if the grating pitch of the first diffraction grating and the grating pitch of the second diffraction grating are formed so as to be equal, the angle of diffraction at the first diffraction grating and the angle of diffraction at the second diffraction grating will be equal. Hence, when the first-order diffracted light that was diffracted by the first diffraction grating, impinges upon and is diffracted by the second diffraction grating, it comes out from the polarization diffraction element in parallel with the zeroth-order diffracted light.

For example if the wavelength of the incident light becomes shorter, the angles of diffraction of the first-order diffracted light at the first diffraction grating and second diffraction grating consequently become smaller. However, as the grating pitches of the two diffraction gratings are designed so as to be equal, the aforementioned angles of diffraction are equal, and the first-order diffracted light comes out in parallel with the zeroth-order diffracted light, in the same way as when the incident light of the given wavelength was impinging. As the angles of diffraction become smaller, the first-order diffracted light slips off the predetermined optical path when traveling inside the substrate. However since the substrate is thin, the deviation from the optical path is a slight one, and the position where the first-order diffracted light comes out from the polarization diffraction element is shifted only slightly. Accordingly, when such a polarization diffraction element is incorporated in an optical pickup device, the first-order diffracted light may be detected at a predetermined position on a photodetector even when the wavelength of the incident light varies, by converging the first-order diffracted light on the photodetector, across an optical system composed of a converging lens or other members.

In addition, since the zeroth-order diffracted light and the first-order diffracted light that were separated by the polarization diffraction element travel in parallel directions, the photodetectors that detect these polarized lights can be mounted in close proximity. The space the photodetectors occupy is thus reduced. Accordingly, when incorporating the polarization diffraction element in an optical pickup device, the design of an optical pickup device that is compact and light is facilitated.

Furthermore, as the incident light has to go through two diffraction gratings, the degree of polarization of the zeroth-order diffracted light and the degree of polarization of the first-order diffracted light are reduced, whereby the degree of separation of the polarizations is enhanced. The accuracy in the detection of the polarized lights may be thus improved.

Further, an optical element in accordance with the present invention comprises a polarization diffraction unit in which:

a diffraction grating which grating pitch is approximately equal to the wavelength of the light the diffraction grating is designed for, is formed on a face of a transparent substrate, and a phase compensating grating which grating lines are virtually orthogonal to the lines of the diffraction grating, is formed on the face of the substrate opposite to the face whereon the diffraction grating is formed.

In the polarization diffraction unit, the phase compensating grating is formed on the face of the substrate opposite to the face whereon the diffraction grating is formed. As a result, the phase difference that occurs between two polarizations in the diffraction grating is compensated by the phase compensating grating, and the polarizations are in phase when the light comes out from the substrate. Moreover, as its grating lines are virtually orthogonal to the lines of the diffraction grating, no diffraction occurs in the phase compensating grating.

An optical pickup device in accordance with the present invention is provided with:

a light source such as a semiconductor laser that irradiates a linearly polarized light such as a laser beam on a magneto-optical recording medium, a photodetector that receives the light reflected from the magneto-optical recording medium and detects the rotation of the plane of polarization due to the magneto-optical effect in the reflected light, and the above polarization diffraction unit mounted between the magneto-optical recording medium and the photodetector.

As the optical pickup device in accordance with the above arrangement comprises the polarization diffraction unit described above, when a linearly polarized light which plane of polarization was rotated when it was irradiated on the magneto-optical recording medium, is transmitted through or diffracted by the polarization diffraction unit and led to the photodetector, practically no phase difference occurs between the two polarizations in the polarization diffraction unit. As a result, since the light that was led to the photodetector across the polarization diffraction unit is a linearly polarized light, information on the magneto-optical recording medium can be accurately reproduced.

Further, an optical pickup device in accordance with the present invention comprises a polarized light detecting unit that is provided with:

a diffraction grating which grating pitch is approximately equal to the wavelength of the light the diffraction grating is designed for, that is formed on a transparent substrate, and that separates an incident light into two polarized lights having mutually orthogonal polarizations, a first photodetector that is mounted integrally and virtually in parallel with the substrate, and that receives a zeroth-order diffracted light produced by the diffraction grating, and a second photodetector that is located in the same plane as the first photodetector and mounted integrally with the first photodetector and the substrate, and that receives a first-order diffracted light produced by the diffraction grating;

and that is designed such that the distance between the diffraction grating and the first and second photodetectors is within 10 mm.

An optical pickup device in accordance with the present invention comprises a polarized light detecting unit that is provided with:

converging means composed by a convex lens or other member, for converting a parallel or diverging beam into a converging beam, a diffraction grating which grating pitch is approximately equal to the wavelength of the light the diffraction grating is designed for, that is formed on a transparent substrate, and that splits an incident light coming from the converging means into two polarized lights having mutually orthogonal polarizations, a first photodetector that is mounted integrally and virtually in parallel with the substrate, and that receives a zeroth-order diffracted light produced by the diffraction grating, and a second photodetector that is located in the same plane as the first photodetector and mounted integrally with the first photodetector and the substrate, and that receives a first-order diffracted light produced by the diffraction grating;

and that is designed such that the distance between the diffraction grating and the first and second photodetectors is within 2 mm.

In each of the polarized light detecting units described above, the grating pitch should be set to 0.5 to 1 time the wavelength of the light the diffraction grating is designed for.

The diffraction grating may be a relief type diffraction grating formed by recessions and protrusions.

In this case the cross section of the diffraction grating may be for instance a rectangular profile or a sinusoidal wave profile.

The substrate may be made of glass or of plastic.

In the second polarized light detecting unit described above, the convergence angle of the converging beam should preferably be less than 20°.

Further, in each of the above optical pickup devices, the first and second photodetectors may be formed directly on the substrate on the face opposite to the face whereon the diffraction grating is formed.

In the polarized light detecting unit of an optical pickup device in accordance with the present invention as described in the first arrangement, the diffraction grating having a polarization property and the first and second photodetectors that receive the different polarized lights are formed integrally. As a result, the number of parts may be cut down, and the relative positions of the diffraction grating and the first and second photodetectors can be determined accurately. In addition, as the distance between the diffraction grating and the first and second photodetectors was set such as to be within 10 mm, the overall polarized light detecting unit can be designed in a small size. The optical pickup device comprising the polarized light detecting unit may be thus formed in a compact size.

Further, as the substrate whereon the diffraction grating is formed and the first and second photodetectors are separated by a short distance and formed integrally, the first-order diffracted light is not likely to slip off the second photodetector even when the angle of diffraction changed because of a fluctuation in the wavelength of the light (a laser light or the like) due to a variation in the temperature or other reason. Its detection can be thus performed accurately by the second photodetector.

On the other hand, in the polarized light detecting unit of an optical pickup device in accordance with the present invention as described in the second arrangement, the converging means is mounted short of the diffraction grating and a converging beam is made to impinge on the diffraction grating. As a result, the distance between the diffraction grating and the first and second photodetectors may be further reduced and set so as to be within 2 mm. The polarized light detecting unit and the optical pickup device may be thus made smaller and lighter.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a vertical cross-sectional view illustrating the structure of a polarization diffraction element and the state of diffraction of an incident light when it is diffracted by the polarization diffraction element;

FIG. 2 is a partially enlarged view of FIG. 1 illustrating the form of a diffraction grating;

FIG. 3 is a vertical cross-sectional view illustrating the situation in which polarized lights that were separated by the polarization diffraction element are detected;

FIG. 5 is a partial cross-sectional view illustrating the form of a diffraction grating;

FIG. 6 is a perspective view illustrating an optical element serving as a phase shifting element;

FIG. 7 is a graph illustrating the relationship between the groove depth of the grating and phase differences;

FIG. 8 is a graph illustrating the relationship between the groove depth of the grating and the transmittance of the light;

FIG. 9 is a partial cross-sectional view illustrating the form of a diffraction grating;

FIG. 10 is a perspective view of an optical member provided with an antireflection element;

FIG. 11 is a cross-sectional view illustrating a polarization diffraction element;

FIG. 12 is a partially enlarged vertical cross-sectional view of FIG. 11 illustrating the form of a diffraction grating;

FIG. 13($a$) and FIG. 13($b$) are front views respectively illustrating a diffraction grating and a phase compensating grating;

FIG. 14 is a schematic organization chart illustrating an optical pickup device;

FIG. 15 is a graph illustrating the relationship between the groove depth of the diffraction grating and the phase difference of TE and TM polarizations;

FIG. 16 is a front view illustrating a modified example of the phase compensating grating;

FIG. 17 is a schematic cross-sectional view illustrating a polarized light detecting unit;

FIG. 18 is a partially enlarged vertical cross-sectional view of FIG. 17 illustrating the form of a diffraction grating;

FIG. 19 is a view illustrating an optical pickup device that includes the polarized light detecting unit;

FIG. 20 is a view illustrating a polarized light detecting unit;

FIG. 21 is a schematic cross-sectional view illustrating the polarized light detecting unit body;

FIG. 23 to FIG. 42 illustrate conventional examples;

FIG. 23 is a view illustrating essential parts of a modified example of the optical pickup device of FIG. 30;

FIG. 24($a$) is an enlarged view illustrating essential parts of FIG. 23;

FIG. 24($b$) is a front view illustrating the photodetector of FIG. 24($a$);

FIG. 25 is a view illustrating essential parts of another modified example of the optical pickup device of FIG. 30;

FIG. 26 is a schematic organization chart illustrating an optical pickup device;

FIG. 27 is a view illustrating the rotation of the plane of polarization due to the magneto-optical effect;

FIG. 28 is a view illustrating a Kerr angle of rotation that was increased;

FIG. 29 and FIG. 30 illustrate optical pickup devices;

FIG. 31 is a front view illustrating a birefringent wedge;

FIG. 32 is a vertical cross-sectional view illustrating the structure of a polarization diffraction element and the state of diffraction of an incident light when it is diffracted by the polarization diffraction element;

FIG. 33 is a schematic organization chart illustrating an optical pickup device;

FIG. 34 is a front view illustrating the polarization diffraction grating in the device of FIG. 33;

FIG. 35 is a view illustrating an optical pickup device that includes a diffraction element;

FIG. 36 is a cross-sectional view illustrating in detail a section of FIG. 35;

FIG. 37 is a graph illustrating the relationship between the groove depth of a diffraction grating and the diffraction efficiency of TE and TM polarizations;

FIG. 38 is a perspective view illustrating a phase shifting element;

FIG. 39 is a time chart illustrating the phase difference between the different polarizations of a linearly polarized light;

FIG. 40 is a time chart illustrating the phase difference between the different polarizations of a circularly or elliptically polarized light;

FIG. 41($a$) is view illustrating a specimen of a linearly polarized light;

FIG. 42 is a view illustrating an optical member provided with an antireflection coating.

DETAILED DESCRIPTION OF THE EMBODIMENTS

An embodiment of the present invention will be described with reference to FIG. 1 to FIG. 3.

Figure 1:
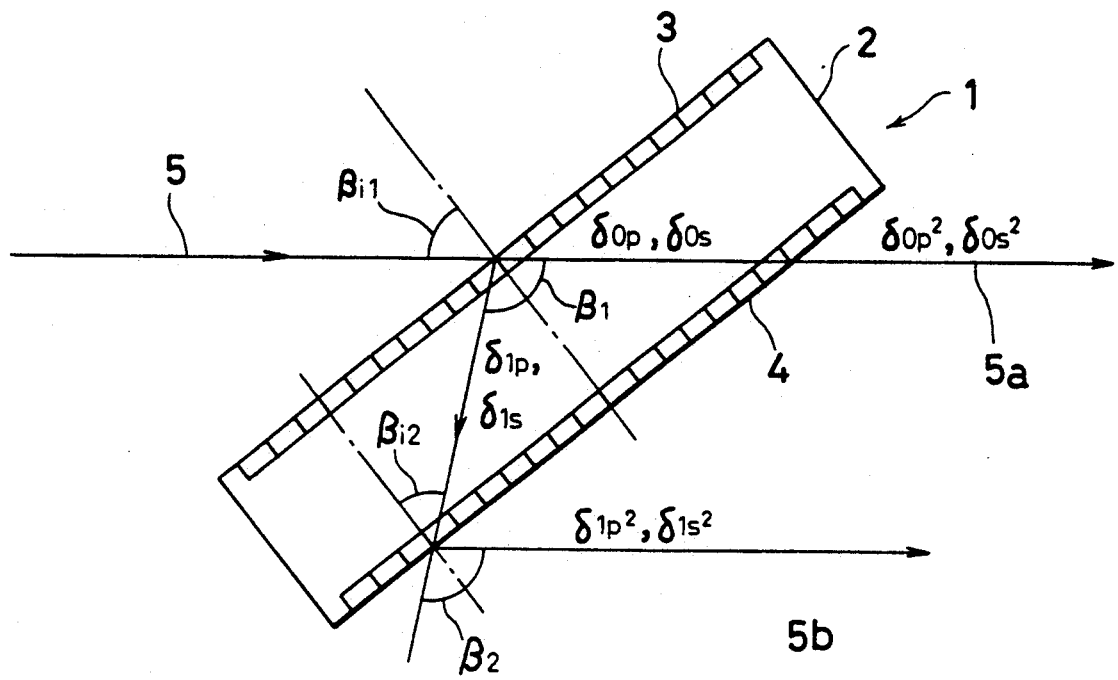
FIG. 1 to FIG. 3 illustrate an embodiment of the present invention.

As illustrated in FIG. 1, a polarization diffraction element 1 as an optical element is composed by a substrate 2 that is transparent, of a flat plate shape and made of glass or other material, and by diffraction gratings 3 and 4 mounted on both faces of the substrate 2. The grating pitch of each diffraction grating 3 and diffraction grating 4 is set so as to be approximately equal to the wavelength of an incident light 5. In addition, the grating lines of either of the diffraction gratings 3 and 4 are parallel with the direction orthogonal to the paper surface of the figure. The diffraction gratings 3 and 4 are of the type which are for example etched into the substrate 2.

Figure 2:
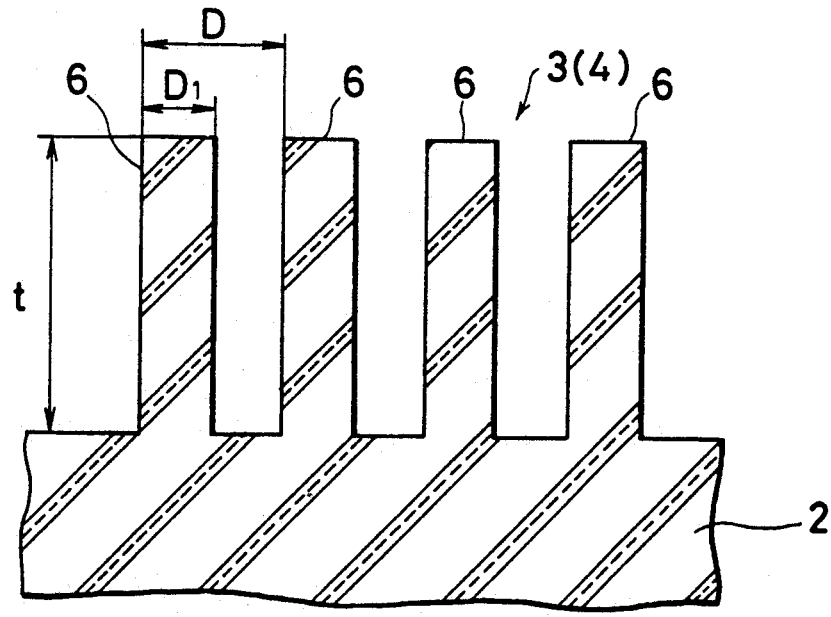

As illustrated in FIG. 2, in the diffraction gratings 3 and 4 there are formed rectangular protrusions 6 inside equal grating pitches D. The diffraction gratings 3 and 4 are arranged so that a P polarization contained in the incident light 5, whose electric field oscillates in a direction parallel with the paper surface of FIG. 1, is transmitted at virtually 100% therethrough. A S polarization contained in the incident light 5, whose electric field oscillates in a direction orthogonal to the paper surface of FIG. 1, is diffracted at virtually 100% thereat. Therefore, when in FIG. 1 the wavelength of the incident light 5 equals 0.8 μm and the index of refraction n of the substrate 2 equals 1.5, the grating pitch D is set to approximately 0.5 μm, the groove depth t of the grating to approximately 1 μm and the ratio of the width $D_1$ of the protrusion 6 to the grating pitch D, i.e. the duty ratio $D_1/D$ is set to 0.5.

As illustrated in FIG. 1, in the arrangement described above, when the incident light 5 impinges upon the polarization diffraction elememnt 1 at an angle of incidence $\beta_{i1}$, the P polarization is transmitted through the diffraction gratings 3 and 4 to produce a zeroth-order diffracted light 5 a, and goes out from the polarization diffraction element 1. On the other hand, the S polarization contained in the incident light 5, is diffracted by the diffraction grating 3 at an angle of diffraction $\beta_1$ to produce a first-order diffracted light 5b, is further diffracted by the diffraction grating 4 at an angle of diffraction $\beta_2$, and goes out from the polarization diffraction element 1.

The angles of diffraction $\beta_1$ and $\beta_2$ are determined in accordance with the grating pitches D of the diffraction gratings 3 and 4, and the wavelength of the incident light 5. Consequently, when the diffraction gratings 3 and 4 are formed so that their grating pitches D are equal, the angles of diffraction $\beta_1$ and $\beta_2$ are also equal. The zeroth-order diffracted light 5a and the first-order diffracted light 5b thus come out from the polarization diffraction element 1 in parallel. By setting the angle of incidence $\beta_{i1}$ of the incident light 5 so that it satisfies the equation:

$$\beta_{i1} = \sin^{-1}(\alpha/2D)$$

where $\alpha$ is the wavelength of the incident light, that is by setting the angle of incidence $\beta_{i2}$ of the incident light 5 at the Bragg angle, the aforementioned angle of incidence $\beta_{i1}$ and an angle of incidence $\beta_{i2}$ can be made equal. The angle of incidence $\beta_{i2}$ is the angle whereat the first-order diffracted light 5b that was diffracted by the diffraction grating 3 impinges upon the diffraction grating 4. The properties of the diffraction gratings 3 and 4 may be thus rendered uniform easily.

The detection of the zeroth-order diffracted light 5a and the fidst-order diffracted light 5b that were separated in the manner discribed above, will be described.

Figure 3:
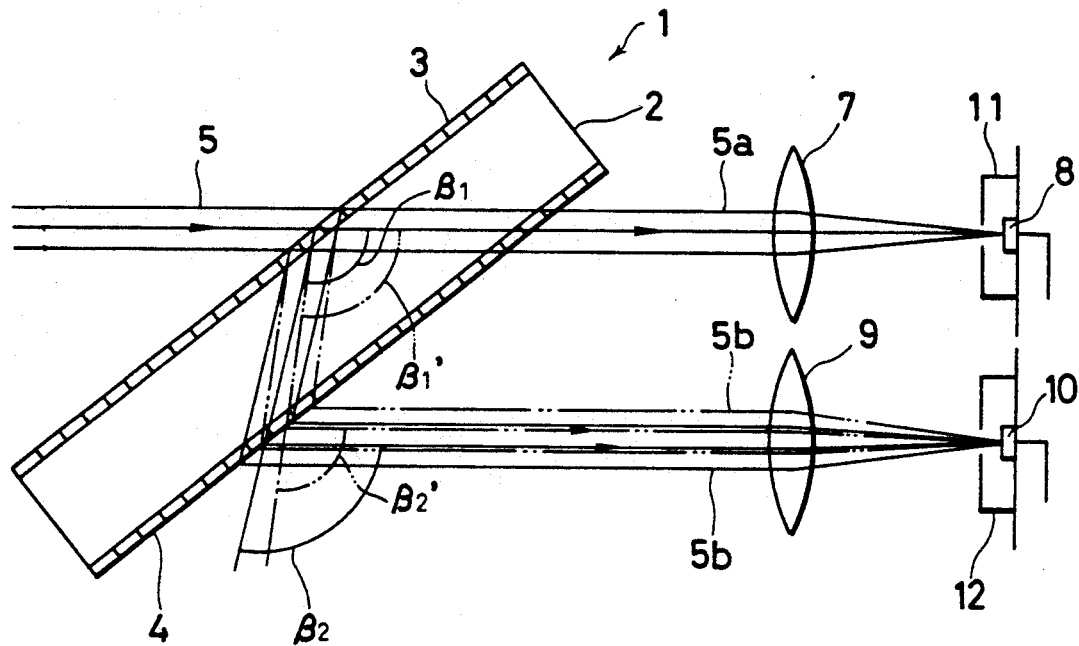

As illustrated in FIG.3, on the optical path of the zweoth-order diffracted light 5a, there are mounted a converging lens 7 at a predetermined distance from the polarization diffraction element 1, and a photodetector 8 at a prescribed focal position. On the other hand, on the optical path of the first-order diffracted light 5b, there are mounted a converging lens 9 at a predetermined distance from the polarization diffraction element 1, and a photodetector 10 at a prescribed focal position. The photodetectors 8 and 10 are respectively installed inside packages 11 and 12.

With such an arrangement, when for certain reasons the wavelength of the incidnet light 5 becomes shorter than the given wavelength, both angles of diffraction $\beta_1$ and $\beta_2$ consequently become smaller angles of diffraction $\beta'_1$ and $\beta'_2$. As a result, the first-order diffracted light 5b that was diffracted by the diffraction grating 3, deviated off the predetermined optical path and travels as shown by the chain double-dashed line, causing the position where the first-order diffracted light 5b impinges on the diffraction grating 4 to be shifted. However, as the substrate 2 is thin, the deviation off the optical path is a slight one, and the position where the first-order diffracted light 5b comes out from the polarization diffraction element 1 is shifted only slightly. In addition, since as discribed above, the grating pitches of the diffraction gratings 3 and 4 are equal, the angles of diffraction $\beta'_1$ and $\beta'_2$ also are equal. As a result, the first-order diffracted light 5b comes out from the polarization diffraction element 1 in parallel with the zeroth-order diffracted light 5a. Accordingly, even when the wavelength of the incident light 5 becomes shorter, the position where the first-order diffracted light 5b comes out from the polarization diffraction element 1 is shifted only slightly, and the first-order diffracted light 5b may be converged on the predetermined position on the photodetector 10 by the converging lens 9.

The degree of polarization obtained with the diffraction gratings 3 and 4 will be described hereinafter.

As shown in FIG. 1, in practice, the zeroth-order diffracted light 5a that was transmitted through the diffraction grating 3 contains a small amount of S polarization that was transmitted with a diffraction efficiency $\delta_{os}$ in addition to the P polarization that was transmitted with a diffraction efficiency $\delta_{op}$. The degree of polarizaation at this time is approximately equal to 0.01, suppose the diffraction efficiencies $\delta_{op}$ and $\delta_{os}$ are equal to 0.99 and 0.01 respectively.

When the zeroth-order diffracted light 5a impinges upon the diffraction grating 4 which has the same diffraction efficiencies $\delta_{op}$ and $\delta_{os}$ as the diffraction grating 3, the diffraction efficiencies $\delta_{op}$ and $\delta_{os}$ are respectively raised to the second power. As a result the P polarization is transmitted with the diffraction efficiency $\delta_{op}^2$, and the S polarization is transmitted with the diffraction efficiency $\delta_{os}^2$. Hence, when the degree of polarization of the zeroth-order diffracted light 5a is determined in the same manner as described above, the value obtained equals approximately 0.0001, that is 1/100 of the value obtained when the zeroth-order diffracted light 5a was transmitted through the diffraction grating 3 only.

Meanwhile, the incident light 5 is diffracted by the diffraction grating 3 to produce the first-order diffracted light 5b with a diffraction efficiency $\delta_{1p}$ for the P polarization and a diffraction efficiency $\delta_{1s}$ for the S polarization. The first-order diffracted light 5b then impinges upon the diffraction grating 4 where the P polarization is diffracted with a diffraction efficiency $\delta_{1p}^2$ and the S polarization is diffracted with a diffraction efficiency $\delta_{1s}^2$. Accordingly, suppose the diffraction efficiencies $\delta_{1p}$ and $\delta_{1s}$ are respectively equal to 0.01 and 0.99, the degree of polarization of the first-order diffracted light 5b equals 0.01 in the diffraction grating 3, and equals 0.0001 in the diffraction grating 4.

This means that the amount of the S polarization contained in the zeroth-order diffracted light 5a is so small that it cian be considered as almost non-existent. The same can be said about the P polarization contained in the first-order diffracted light 5b.

Accordingly, as described above, by having the incident light 5 pass through the diffraction gratings 3 and 4, the degree of separation of the P polarization and S polarization contained in the incident light 5 may be enhanced to a level high enough to be satisfactorily put into practice.

Figure 4:
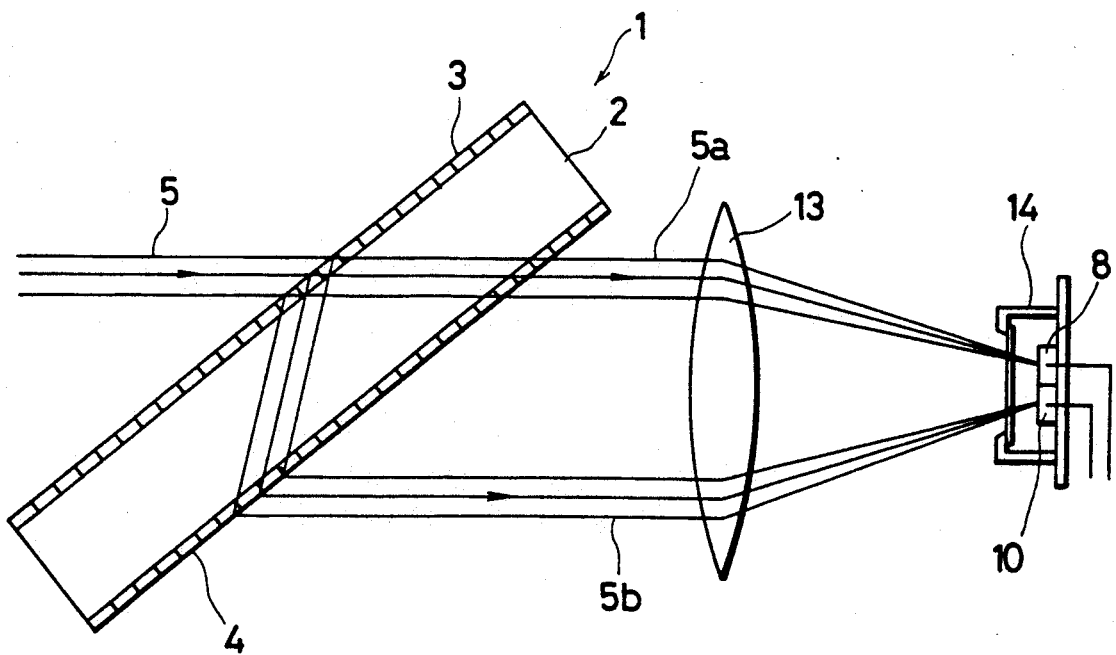
FIG. 4 is a vertical cross-sectional view illustrating another embodiment of the present invention and illustrates the situation in which polarized lights that were separated by the polarization diffraction element are detected.

Another embodiment of the present invention will be described with reference to FIG. 4. The members having the same functions than in the aforementioned embodiment will be designated by the same code and their description will be omitted.

A converging lens 13 that converges a zeroth-order diffracted light 5a as well as a first-order diffracted light 5b, is disposed on the optical path of each of the diffracted lights. Photodetectors 8 and 10 are mounted in a single package 14 at the prescribed focal position of the converging lens 13.

With such an arrangement, the zeroth-order diffracted light 5a and the first-order diffracted light 5b are respectively converged by the single converging lens 13 on positions located approximately in the middle of the optical paths of the diffracted lights. The photodetectors 8 and 10 may be thus mounted in a row on a substrate portion inside the package 14, or may be formed in a row on a single semiconductor substrate made of Si or other material, and may be thus installed in close proximity.

The diffraction gratings 3 and 4 of the polarization diffraction element 1 described in the two aforementioned embodiments were etched into both sides of the substrate 2. However, they may also be formed for example by photoresist or other material. Also, the profile of the diffraction gratings 3 and 4 is not restricted to the rectangular profile shown in FIG. 2, and may be a sinusoidal wave profile or other profile.

As described above, a polarization diffraction element as an optical element in accordance with the present invention comprises a first diffraction grating and a second diffraction grating, each having a grating pitch approximately equal to the given wavelength of an incident light, and each being mounted on a different side of a substrate of a flat plate shape, where the first diffraction grating and second diffraction grating are formed such that their grating pitches are equal, and such that the grating lines of the first diffraction grating and the grating lines of the second diffraction grating are parallel.

According to this arrangement, an incident light is split by the first diffraction grating and the second diffraction grating into polarized lights of different polarizations, which always come out from the polarization diffraction element in parallel. Accordingly, the polarized lights stay in parallel even when a change occurs in the wavelength of the incident light.

Consequently, when the polarization diffraction element is incorporated into an optical pickup device, the optical pickup device may be designed in a compact size by mounting the photodetectors for detecting the different polarized lights in close proximity. In addition, by leading each polarized light to a predetermined position on the corresponding photodetector across an optical system such as a converging lens or the like, the accuracy in the detection of the polarized lights is improved.

Figure 41A:
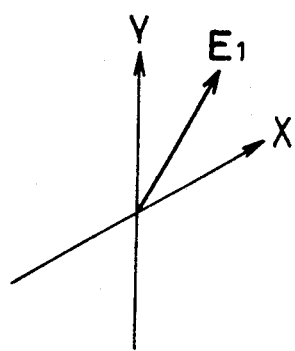
Figure 41B:
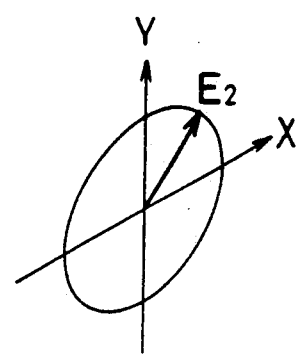
FIG. 41(b) is a view illustrating a specimen of a circularly or elliptically polarized light.
Figure 42:
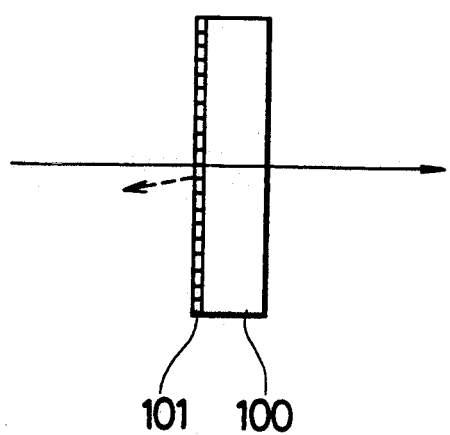

Further, another embodiment of the present invention will be discribed with reference to FIG. 5 to FIG. 8 and as well as FIG. 41.

Figure 6:
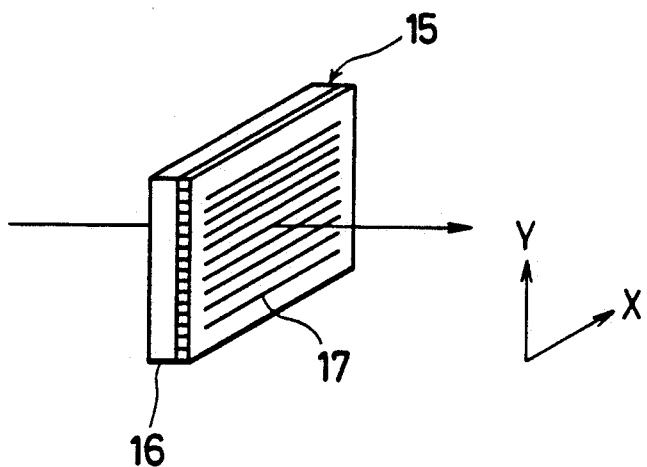

As illustrated in FIG. 6, a phase shifting element 15, as an optical elelment, is provided with a substrate 16 as a base, made of glass, transparent plastic or other material. On one face of the substrate 16, namely on the face where the light emerges, there is mounted a linear grating 17 such that the direction of its grating lines is the X direction as shown in the figure.

Figure 5:
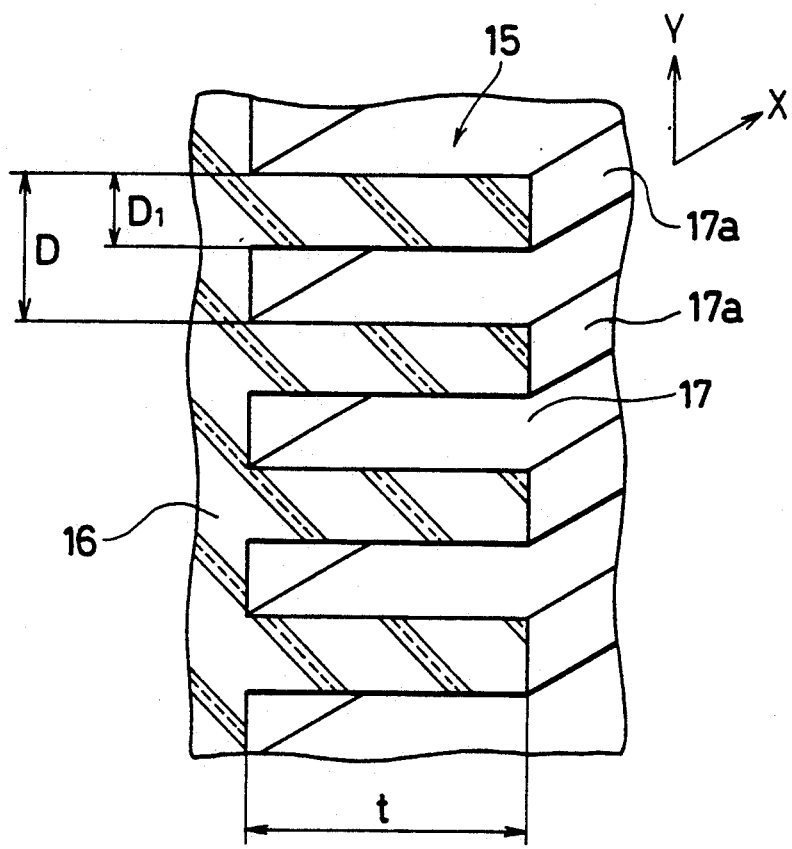
FIG. 5 to FIG. 8 illustrate another embodiment of the present invention.

As illustrated in FIG. 5, the linear grating 17 presents a rectangular profile, as in the previous embodiment. A grating pitch D is set so as to be approximately equal to the wavelength of the light the linear grating 17 is designed for, and the groove depth of the grating is t. The linear grating 17 should preferably be formed so as to satisfy $D \leq a/n$, suppose n is the index of refraction of the substrate 16, $a$ the wavelength of the relative light and D the grating pitch of the linear grating 17.

With such an arrangement, a light that impinged upon the phase shifting element 15, comes out through the linear grating 17 with a predetermined difference produced by the linear grating 17 between the phase of a X direction polarization whose electric field is parallel with the grating lines, and th e phase of a Y direction polarization whose electric field is orthogonal to the grating lines. Here, the phase of the X direction polarization is ahead of he phase of the Y direction polarization. As a result, for example a linearly polarized light $E_1$ shown in FIG. 41(a) may be converted into a circularly or elliptically polarized light $E_2$ shown in FIG. 41(b).

Figure 7:
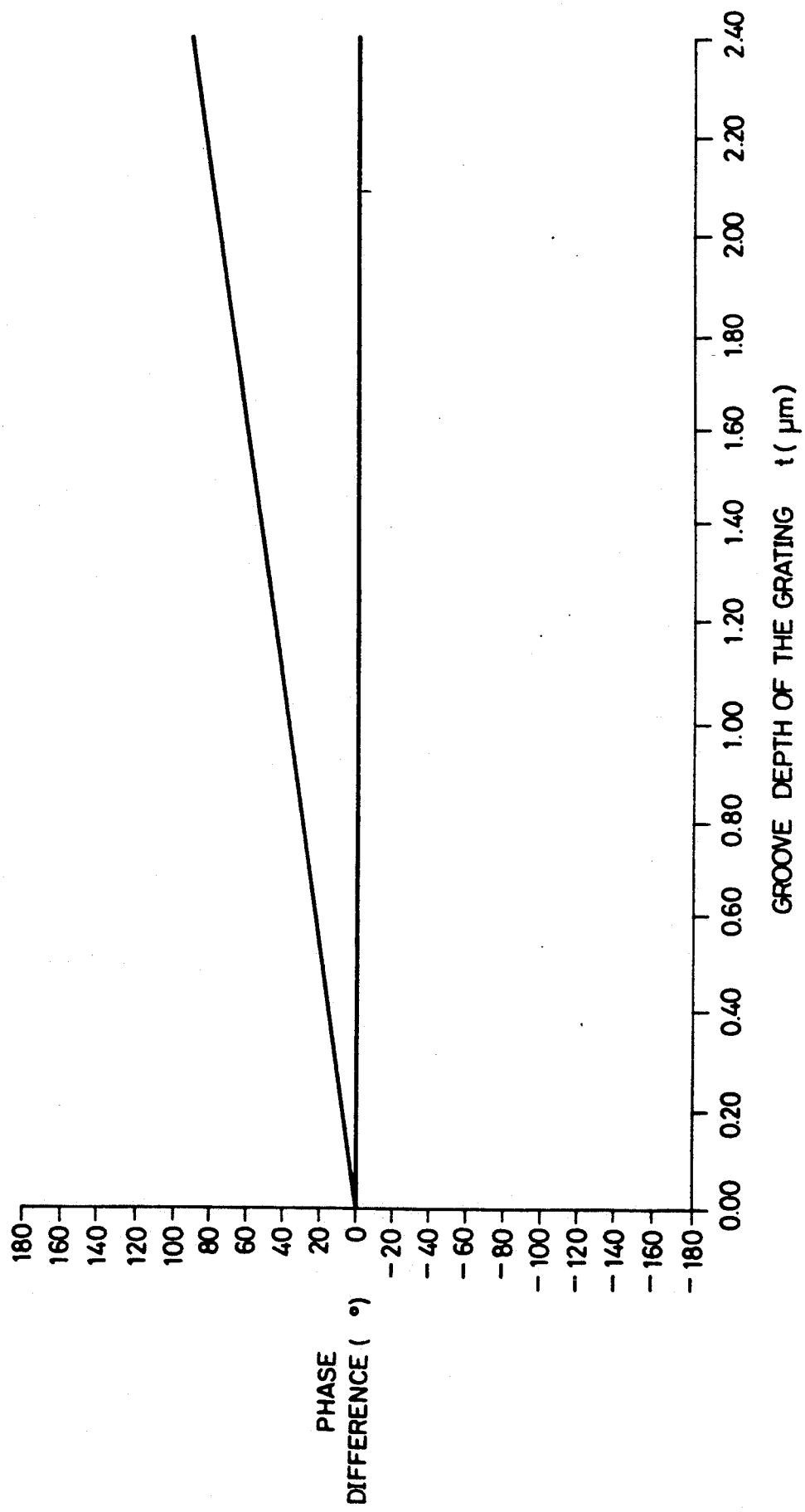

FIG. 7 shows the result obtained when determining mathematically the phase difference when in the phase shifting element 15, the grating pitch D equals 0.46 μm, the width $D_1$ of a protrusion 17a equals 0.23 μm, the index of refraction n of the substrates 16 equals 1.5 and the wavelength of the concerned light equals 0.78 μm. As it is clearly shown in the figure, a phase difference of 90° may be obained between the X direction polarization and the Y direction polarization by setting the groove depth t of the grating so tha t=2.4 μm. A linearly polarized light may be thus converted into a circularly or elliptically polarized light. The angle of incidence of the light on the phase shifting element 15 is assumed to be 0° (vertical incidence).

The aforementioned phase difference can be changed by modifying the combination of the parameters. In the above embodiment, the case where the phase difference is adjusted by means of the groove depth t of the grating, as described.

Figure 8:
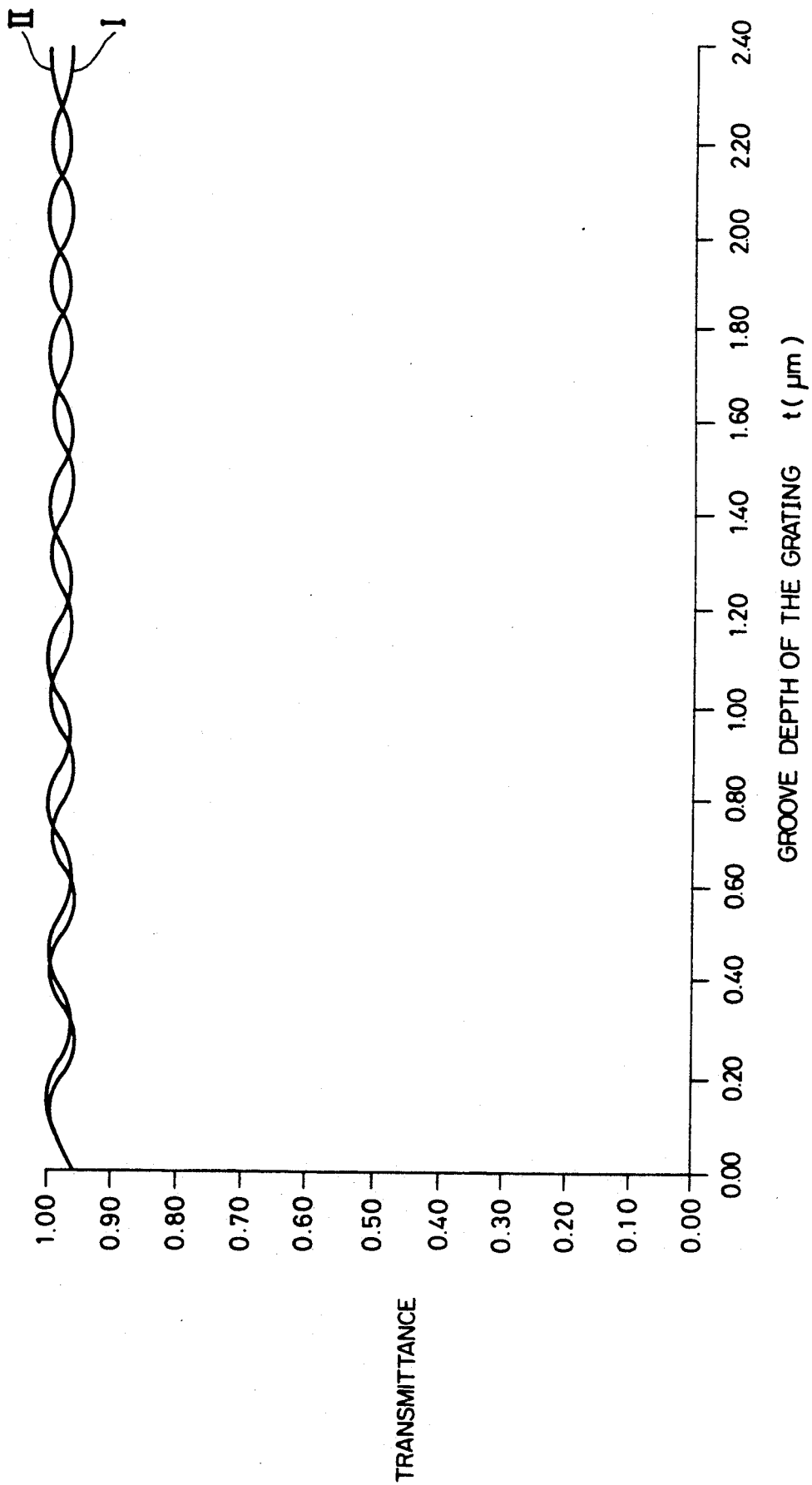

In FIG. 8, a curve I shows the transmittance fo the X direction polarization, and a curve II shows the transmittance of the Y direction polarization, contained in the light that impinged upon the phase shifting element 15, when the light comes out from the phase the shifting element 15. As it is clearly shown in the figure, both transmittances equal at least 96%.

Figure 9:
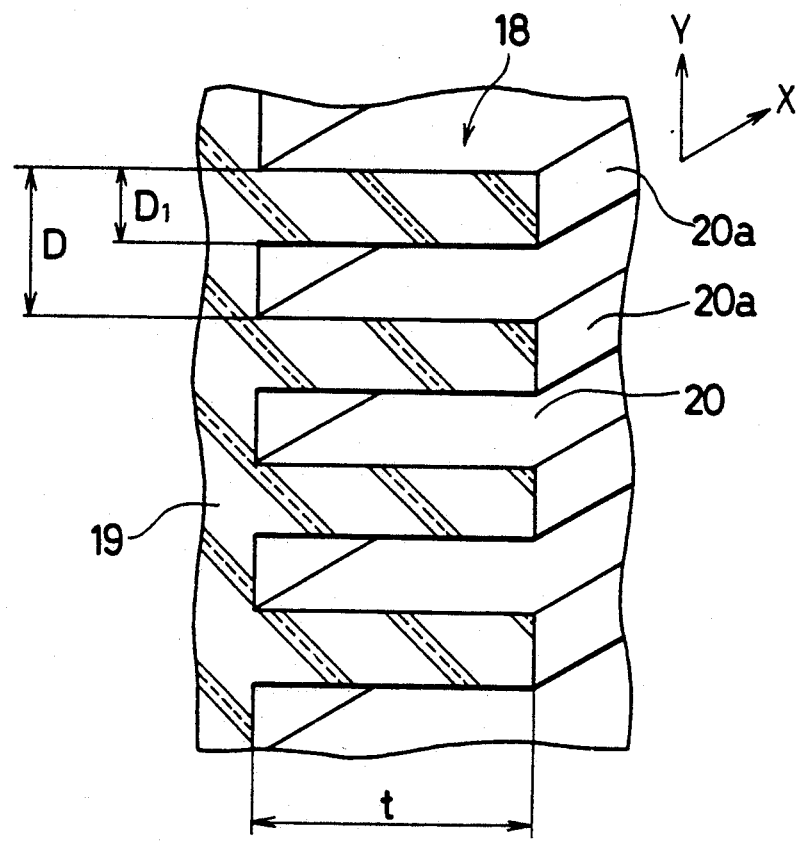
FIG. 9 and FIG. 10 illustrate another embodiment of the present invention.
Figure 10:
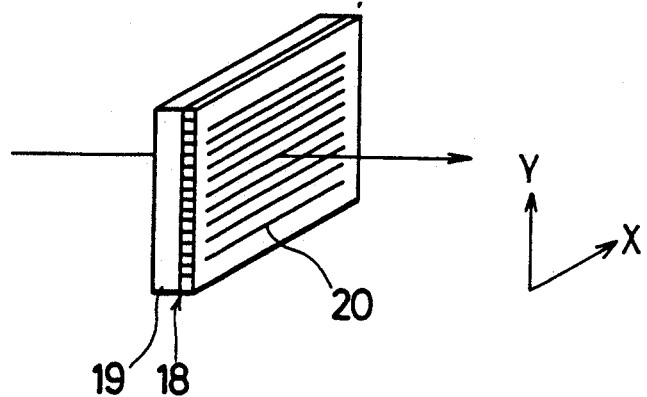

Another embodiment of the present invention will be described with reference to FIG. 8 to FIG. 10.

The present embodiment relates to an antireflection element. As illustrated in FIG. 10, an antireflection element 18 as an optical element, is mounted intergrally with an optical member 19, which face needs to be prevented from reflection. In this case the optical member 19 itself serves as a base and linear 20 of a X direction grating lines is formed on the face of the optical member 19. As illustrated in FIG. 9, the linear grating 20 presents a rectangular profile, like for example the above phase shifting element 15.

With the arrangement described above, when a light comes out from the optical member 19 through the linear grating 20, its reflection is suppressed by the linear grating 20 since most of the light is transmitted through the optical member 19 emerges.

As in the embodiment of the phase shifting element, the transmittance of the X direction polarization is shown by the curve I of FIG. 8, and the transmittance of the Y direction polarization is shown by the curve II of FIG. 8, when the grating pitch D of the linear grating 20 equals 0.46 μm, the width $D_1$ of a protrusion 20a equals 0.23 μm, the index of refraction n of the optical member 19 equals 1.5 and the wavelength α of the concerned light equals 0.78 μm.

As it is clearly shown in FIG. 8, when the groove depth t of the grating equals 0.15 μm, the transmittance of the X polarization equals almost 99%, while the transmittance of the Y direction polarization is greater than 99%. Moreover, when the groove depth t of the grating equals 0.18 μm, the transmittannce of the Y direction polarization is almost equal to 100%. When the reflection prevention of the present embodiment is not performed, the transmittance is approximately equal to 96%. This shows that the linear grating 20 of the present embodiment forms an effective measure for the prevention of reflection. In addition, when the groove depth t of the grating is set between 0.15 μm to 0.18 μm, the phase difference between the X direction and the Y direction polarizations is at most 5°, which is small enough.

In the above embodiment of the antireflection element, the antireflection element 18 is mounted integrally with the optical member 19. However, the antireflection 18 may be formed separately and fixed on the optical member 19 thereafter.

In addition, in each of the aforementioned embodiments, the cross sections of the linear gratings 17 and 20 were rectangular profiles. However, they may also be for example sinusoidal wave profiles.

As described above, an optical element in accordance with the present invention is basically composed by a linear grating which grating pitch is approximately equal to the wavelength of the light it is designed for, formed on a transparent base.

Accordingly, an optical element having a function for shifting a phase and other functions may be easily and inexpensively formed, by merely installing a linear grating on a face of a transparent base with no need for any expensive material or for a material which processing is laborious, such as a crystalline body.

This optical element may be used for example as a phase shifting element. In this case, the relative phase difference between a polarization whose direction is parallel with the direction of the linear grating, and a polarization whose direction is orthogonal to the direction of the grating, is controlled in the linear grating portion of the optical element.

The optical element may also serve as an antireflection element. In this case, the present antireflection element may be formed integrally with the optical members one wants to be prevented from reflection, by forming the linear grating on the optical member itself which serves as a base. By forming the antireflection element integrally with the desired optical member in the manner described above, the structure of the optical member may be simplified and its manufacturing process facilitated.

Moreover, when using the optical element of the present invention as an antireflection element, all that is needed is to install a linear grating for the prevention of reflection. The optical element may be thus applied to bases of any index of refraction. Accordingly, there is no need of using a dielectric material, like in the conventional art, and the laborious tasks such as selecting a dielectric material having a proper index of refraction, and when such a dielectric material does not exist, forming an antireflection coating made of multiple layers of a plurarity of dielectric materials, may be thus eliminated.

An additional embodiment of the present invention will be described with reference to FIG. 11 and FIG. 12.

Figure 11:
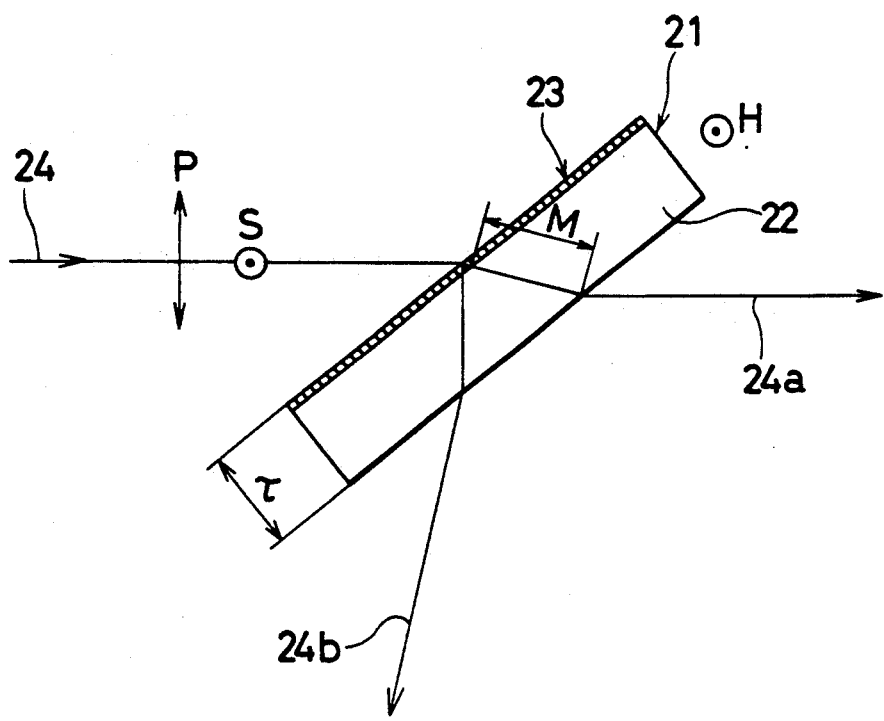
FIG. 11 and FIG. 12 illustrate another embodiment of the present invention.
Figure 12:
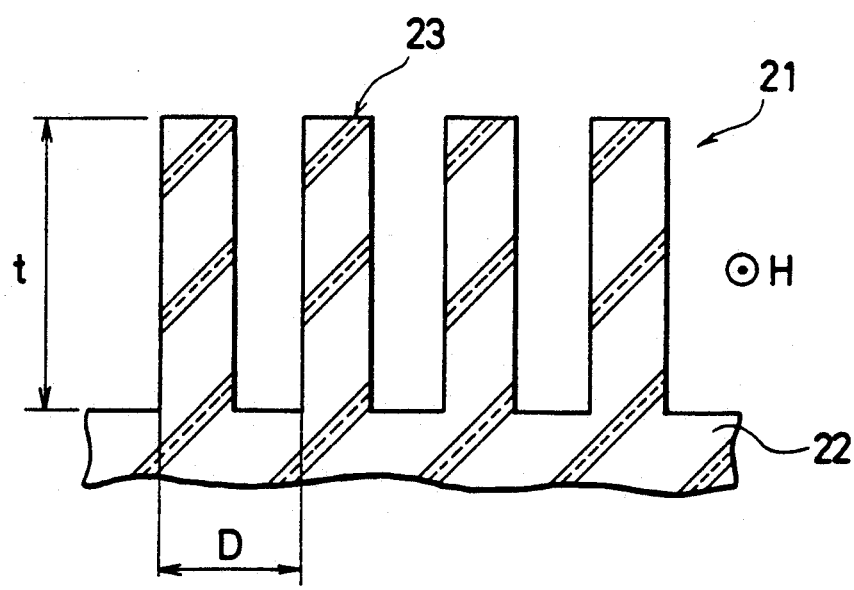
Figure 33:
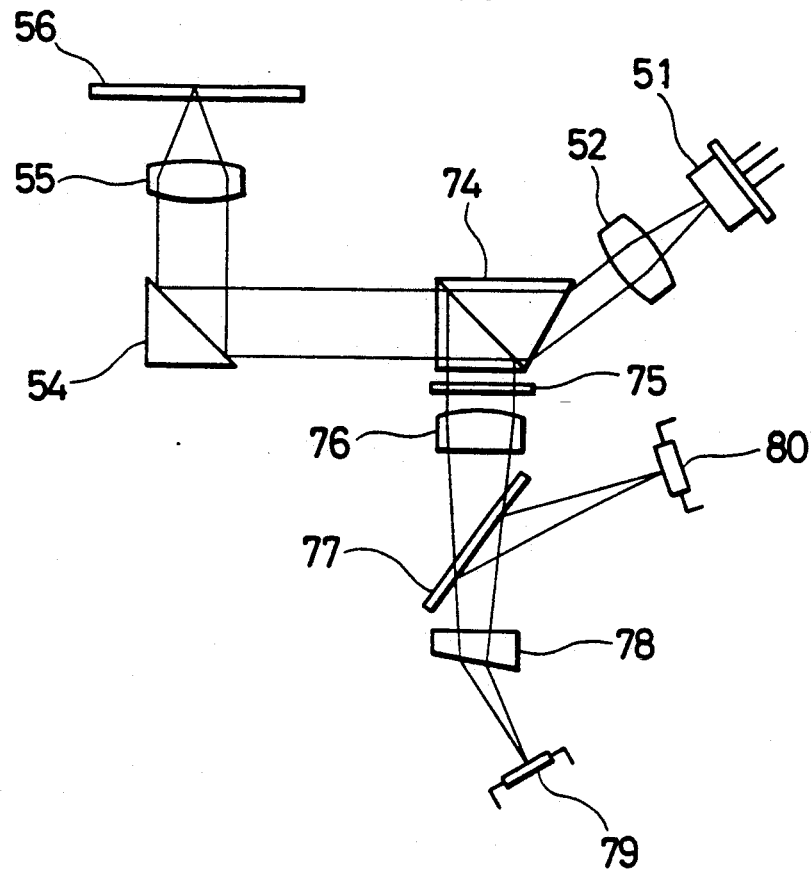
Figure 34:
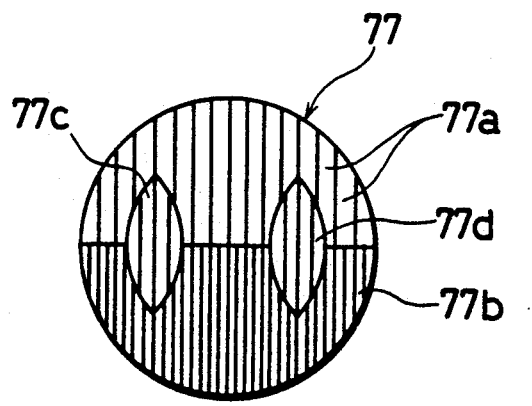

The configuration of the optical pickup device of the present embodiment in basically the same as the conventional example illustrated in FIG. 33, except that a polarization diffraction element 21 as an optical element illustrated in FIG. 11, is employed instead of the polarization diffraction element 77 of the conventional example of FIG. 33. The detailed discription of the optical pickup device itself will be therefore omitted.

The orientation of FIG. 11 that illustrates the polarization diffraction element of the present embodiment, does not correspond exactly to the orientation fo FIG. 33. However, provision is made such that a light 24 coming from the converging lens 76 (not shown) is led to the polarization diffraction element 21, and a zeroth-order diffracted light 24a produced by the the polarization diffraction element 21 is then led across an optical element 78 in a birefringent wedge shape, to the photodetector 79 where the recording signal of the magneto-optical memory element 56 as magneto-optical recording medium, is detected. On the other hand, a first-order diffracted light 24b produced by the polarization diffraction element 21 is led to the photodetector 80 where a tracking error signal and a focus error signal may be obtained (Elements 78, 79, 56 are not shown in FIG. 11).

The substrate 22 of the polarization diffraction element 21 is made of an uniaxial crystal provided with a single optical axis, for example quartz. As illustrated in FIG. 12, a diffraction grating 23 is formed on the face of the substrate 22 that faces the magneto-optical memory element 56. The diffraction grating 23 is provided with a rectangular profile, and has the same predetermined groove depth t and grating pitch than the polarization diffraction element 1 described earlier.

The diffraction grating 23 is formed such that its grating lines are parllel with the optical axis H of the substrate 22, which extends in a direction orthogonal to the drawing surface. If an uniaxial crystal is used to form the substrate 22, and if the diffraction grating 23 is formed so as to be parallel with the optical axis H, the polarization direction with respect to the optical axis H of a light that impinged upon the polarization diffraction element 21, does not vary even if the light is refracted or diffracted. As a result the design of the polarization diffraction element 21 is facilitated, and a maximum polarization anisotropy may be obtained.

In order to give a polarization property to the diffraction grating 23, its grating pitch D is set so as to be approximately equal to the wavelength of the laser light used for recording and/or reproducing, preferably to between 0.5 to 2 times the wavelength of the laser light. For instance, suppose the wavelength of the laser light is 0.8 μm, the grating pitch D is set so as to be 0.5 μm, and the groove depth t of the grating is set so as to be 0.6 μm. In this case, a zeroth-order diffraction efficiency $\delta_{OS}$ is equal to 0.3 and a first-order diffraction efficiency $\delta_{1S}$ is equal to 0.7 for the S polarization. For the P polarization, a zeroth-order diffraction efficiency $\delta_{OP}$ is equal to 1.0 and a first-order diffraction efficiency $\delta_{1P}$ is equal to 0. The Kerr angle of rotation for the zeroth-order diffracted light 24a may be thus increased in appearance, as in the conventional example described earlier.

However, a phase difference between the P polarizations and S polarizations of the zeroth-order and first-order diffracted light 24a and 24b, occurs due to the polarization property of the diffraction grating 23. As in the present embodiment, the reproduction of recording signals on the magneto-optical memory element 56 is performed by means of the zeroth-order diffracted light 24a, the phase difference between the different polarizations of the zeroth-order diffracted light 24a needs to be compensated.

Hencee, the thickness τ of the substrate 22 in the polarization diffraction element 21 is set to a value such that the difference between the phases of the P polarization and the S polarization of the zeroth-order diffracted light 24a occurring in the diffraction grating 23, and the difference occurring between the phases of the P and S polarizations when the zeroth-order diffracted light 24a propagates through the substrate 22, cancel out.

Namely, as the substrate 22 has an optical anisotropy property, the P polarization of the zeroth-order diffracted light 24a becomes an ordinary ray having an index of refraction $n_O$, and the S polarizaton becomes an extraordinary ray having a index of refraction $n_e$ ($\neq n_o$). For example if the substrate 22 is made of quartz, $n_o = 1.52$ and $n_e = 1.48$.

In this case, when the distance the zeroth-order diffracted light 24a propagates through the substrate 22 is M, the phase difference $\Delta_{\sigma M}$ (rad.) that occurs between the P and S polarizations due to the optical anisotropy property of the substrate 22, is:

$$\Delta_{\sigma M} = \frac{2\pi}{\alpha}(n_o - n_e)M$$

Consequently, the thickness τ of the substrate 22 should be adjusted such that the sum of the above $\Delta_{\sigma M}$ and the phase difference $\Delta_{\Gamma G}$ that occurs between the P polarization and D polarization due to the diffraction grating 23, equals 0, and that the phase differences $\Delta_{\sigma M}$ and $\Delta_{\sigma G}$ cancel out. Accordingly, there is no phase difference between the P polarization and S polarization of the zeroth-order diffracted light 24a that was transmitted through the polarization diffraction element 21. The zeroth-order diffracted light 24a is thus a linearly polarized light whereby the detection of the recording signals based on the Kerr angle of rotation may be performed with high accuracy, and recording signals of high quality may be obtained.

In the above embodiment, the diffraction grating 23 of a rectangular cross section is formed on the side of the substrate 22 that faces the magneto-optical disk. However, the diffraction grating 23 may be diffraction grating of a refractive index modulation type formed such that its index of refraction differs with the index of refraction of the remaining portion of the substrate, for example by impregnating the substrate with impurities such as $Na^+$, $K^+$, $Ag^+$ or the like. In this case also, the diffraction grating of the refractive index modulation type, should be designed such that its grating lines are parallel with the optical axis H, and such that its grating pitch is approximately equal to the wavelength of the laser light.

As described above, a polarization diffraction element as an optical element in accordance with the present invention, is provided with a substrate made of a material having an optical anisotropy property, and with a diffraction grating constituted of a linear grating, and is designed such that the thickness of the substrate is set so that the phase difference occurring between P and S polarizations due to the above diffraction grating, and the phase difference occurring between the P and S polarizations when the the diffracted light propagates through the substrate, cancel out.

Accordingly, as the substrate is made of a material having an optical anisotropy property, a phase difference occurs between the P and S polarizations when zeroth-order and first-order diffracted lights propagate through the substrate, This phase difference varies with the distance of propagation through the substrate. Therefore, in the polarization diffraction element, when the phase difference between the P and S polarizations of the zeroth-order diffracted light needs to be eliminated, the phase differnece between the P and S polarizations of the zeroth-order diffracted light occurring in the diffraction grating may be compensated by adjusting the thickness of the substrate. Namely, the thickness of the substrate should be set such that the phase difference occurring between the different polarizations of the zeroth-order diffracted light due to the optical anisotropy property of the substrate, and the phase difference occurring between the different polarizations of the zeroth-order diffracted light due to the polarization property of the diffraction grating, cancel out.

Similarly, when the phase difference between the P and S polarizations of the first-order diffracted light needs to be eliminated, the thickness of the substrate should be set such that the phase difference between the different polarizations of the first-order diffracted light occurring due to the optical anisotropy property of the substrate, and the phase difference between the different polarizations of the first-order diffracted light occurring due to the polarization property of the diffraction grating, cancel out.

Moreover, in order to give a polarization property to the polarization diffraction element, the grating pitch thereof should be set as to be approximately equal to the wavelength of the diffracted light. If the subsrtate is made of an uniaxial crystal, and the diffraction grating designed so as to be parallel with the optical axis of the substrate, the polarization direction with respect to the optical axis, of a light that impinged upon the polarization diffraction element does not vary, even when the light is refracted or diffracted. The design of the polarization diffraction element is thus facilitated, and a maximum polarization anisotropy can be obtained. As a result, the thickness of the substrate needed for compensating the phase difference between the P polarization and the S polarization occurring in the diffraction grating, can be reduced.

An optial pickup device in accordance with the present invention is provided with a light source, an optical system for guiding a light beam projected from the light source onto a magneto-optical recording medium and leading the reflected light therefrom to photodetectors, photodetectors for detecting the recording signals of the magneto-optical recording medium based on the Kerr angle of rotation, and said system arranged such that the aforementioned polarization diffraction element in accordance with the present invention, is mounted in the optical path of the reflected light extending from the magneto-optical recording medium to the photodetectors.

Accordingly, when detecting recording signals based on the Kerr angle of rotation, if for instance the detection is performed based on the Kerr angle of rotation of the zeroth-order diffracted light produced by the polarization diffraction element, the thickness of the substrate of the polarization diffraction element should be determined so that no phase difference occurs between the P and S polarization of tahe zeroth-order diffracted light. Consequently, the zeroth-order diffracted light that was transmitted through the polarizaton diffraction element, is a linearly polarized light, whereby the detection of the recording signals may be performed accurately.

When the detection is performed based on the Kerr angle of rotation of the first-order diffracted light produced by the polarization diffraction element, the thickness of the substrate of the polarization diffraction element should be set such that no phase difference occurs between the P and S polarizations of the first-order diffracted light.

Another embodiment of the present invention will be described with reference to FIG. 13 to FIG. 16 as well as to FIG. 35.

Figure 14:
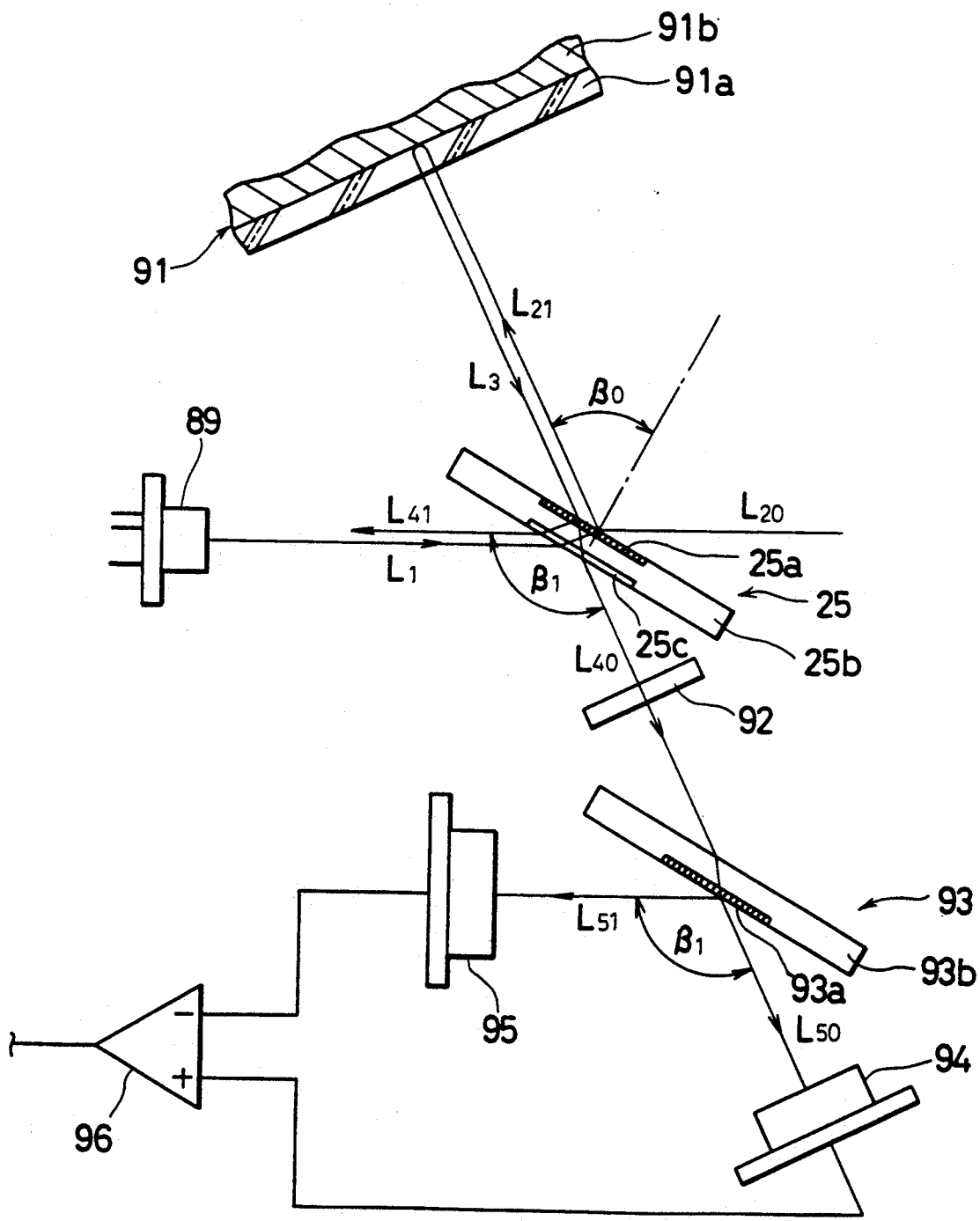
Figure 35:
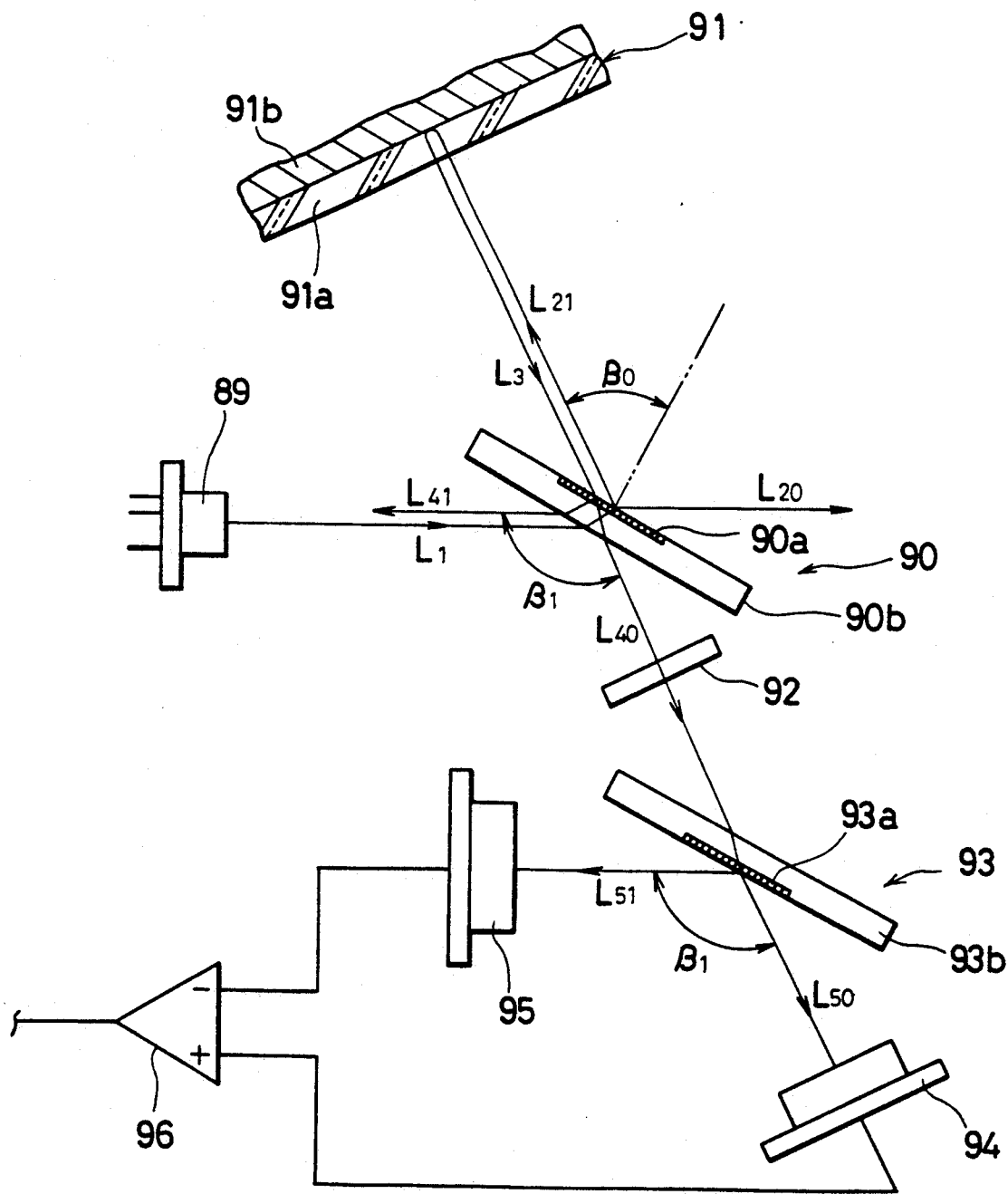
Figure 36:
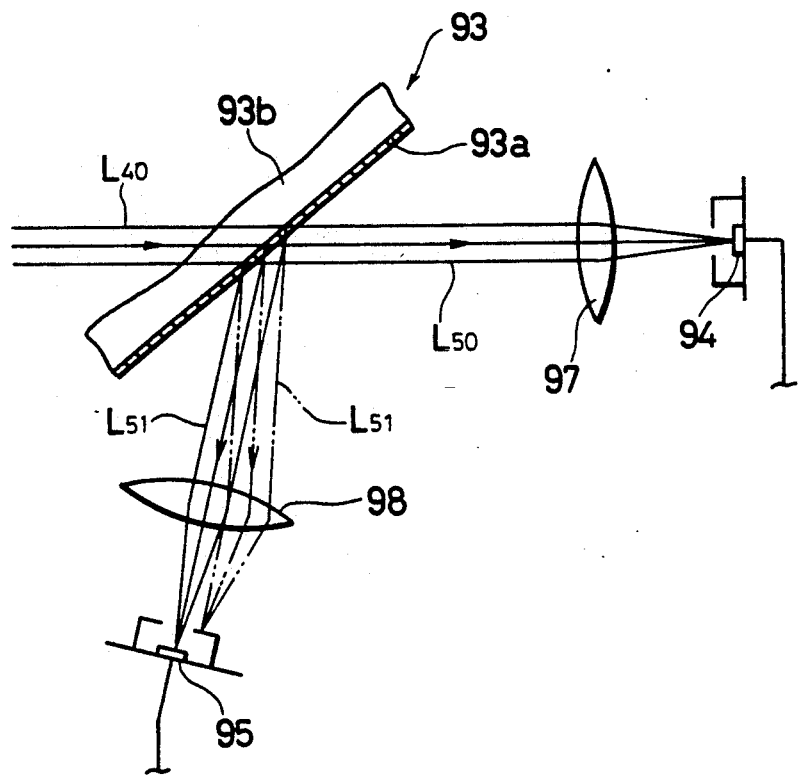
Figure 37:
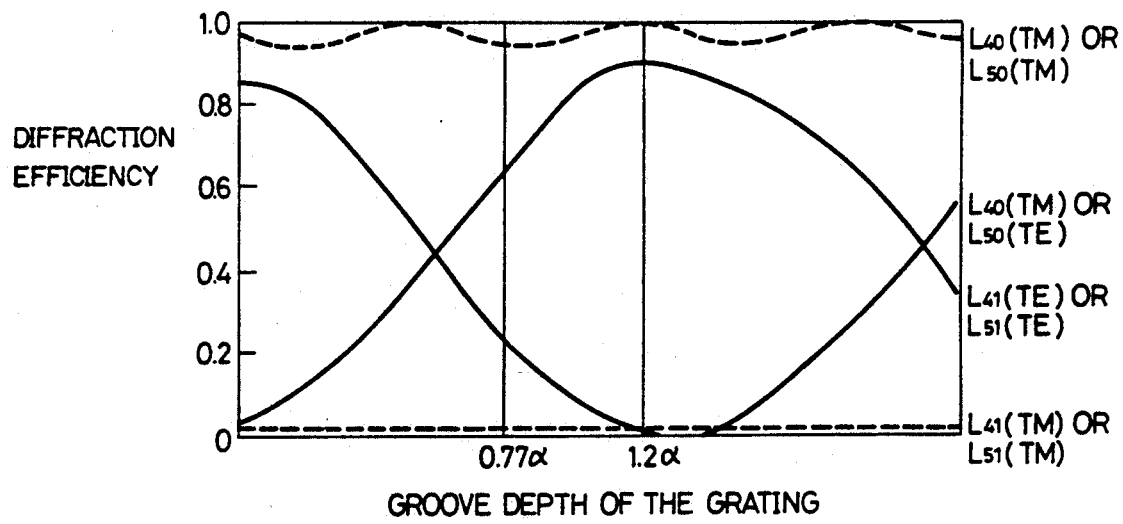

The configuration of the optical pickup device of the present embodiment is basically the same as the conventional example illustrated in FIG. 35, except that a polarization diffraction unit 25 illustrated in FIG. 14, is employed instead of the substrate 90b and the diffraction grating 90a of the diffraction element 90 in the conventional example of FIG. 35. The members having the same functions than in the optical pickup device shown in FIG. 35 will be therefore designated by the same numbers and their description will be omitted.

As illustrated in FIG. 14, in front of a semiconductor laser 89 as a light source, there is mounted the polarization diffraction unit 25. The polarization diffraction unit 25 is provided with a transparent substrate 25b made of glass or other material. On the face of the substrate 25b opposite to the face that faces the semiconductor laser 89, there is formed a diffraction grating 25a (see FIG. 13(a)) that has the same polarization property, i.e. the same grating lines direction, grating pitch and groove depth, as the diffraction grating 90a illustrated in FIG. 35. The diffraction grating 25a splits a laser light $L_1$ projected from the semiconductor laser 89, into a zeroth-order diffracted light $L_{20}$, that is a transmitted light, and a first-order diffracted light $L_{21}$. The diffraction grating 25a also splits a reflected light $L_3$ from the magneto-optical memory element 91, as a magneto-optical recording medium, that was disposed so that the first-order diffracted light $L_{21}$ is irradiated in a direction orthogonal to its surface, into a zeroth-order diffracted light $L_{40}$ and a first-order diffracted light $L_{41}$ that is diffracted toward the semiconductor laser 89.

The degree of inclination of the substrate 25b is set such that the reflected light $L_3$ from the magneto-optical memory element 91 impinges upon the diffraction grating 25a at a Bragg angle $\beta_0$ ($\beta_0 = \sin^{-1}(\alpha/2D)$), where $\alpha$ is the wavelength of the laser light being used, and D is the grating pitch of the diffraction grating 25a.

However, when the reflected light $L_3$ from the magneto-optical memory element 91, is transmitted through the diffraction grating 25a to produce the zeroth-order diffracted light $L_{40}$, as described in the conventional example, a phase difference occurs between a TE polarization $L_{40}$(TE) contained in the zeroth-order diffracted light $L_{40}$, and a TM polarization $L_{40}$(TM) contained in the zeroth-order diffracted light $L_{40}$.

Figure 15:
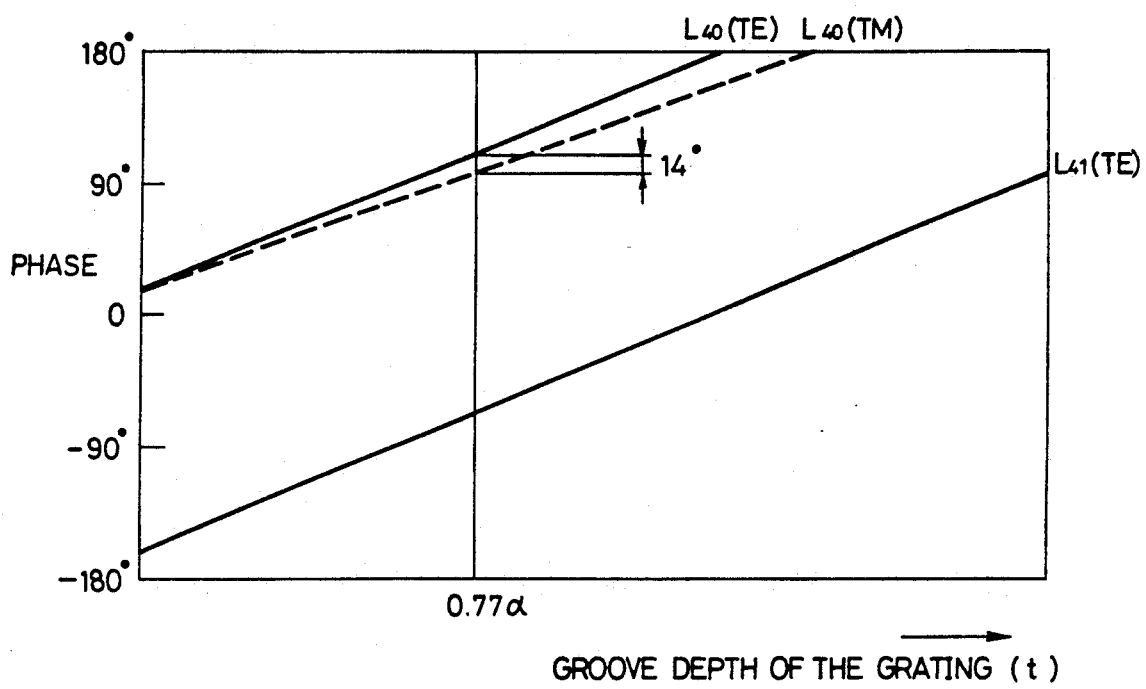

FIG. 15 illustrates the relationship between the groove depth t of the grating and the phases of $L_{40}$(TE), $L_{40}$(TM) and $L_{41}$(TE). As it is clearly shown in the figure, the phase difference between $L_{40}$(TE) and $L_{40}$(TM) increases as the groove depth t increases. When in the diffraction grating 25a, the groove depth t of the grating is set to $0.77\alpha$, the phase difference is equal to 14°.

Hence, on the face of the substrate 25b that faces the semiconductor laser 89 there is formed a phase compensating grating 25c for compensating the phase difference occurring in the diffraction grating 25a.

Figure 13A:
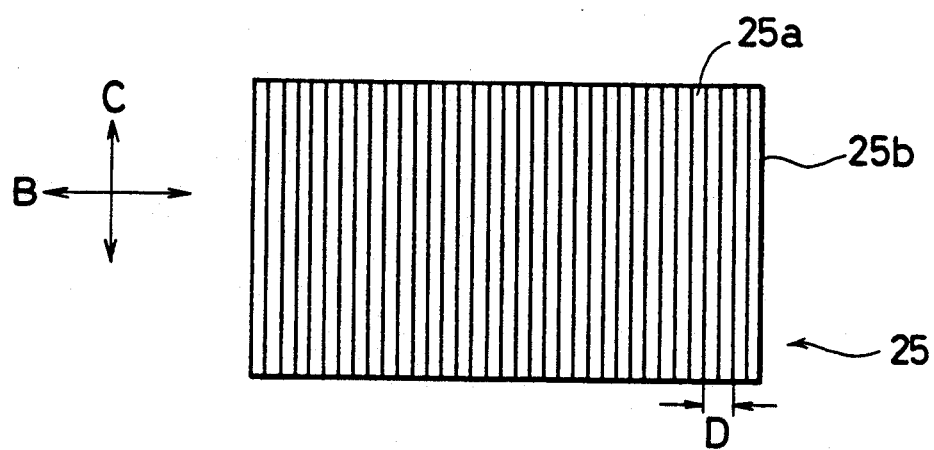
FIG. 13 to FIG. 16 illustrate another embodiment of the present invention.
Figure 13B:
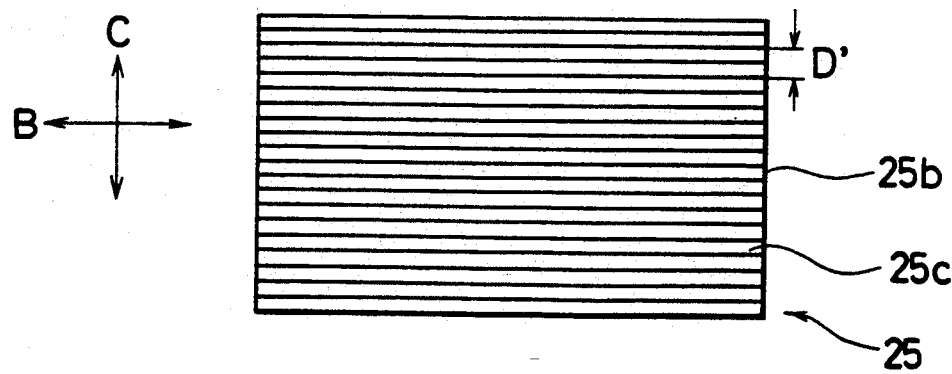

As illustrated in FIG. 13(b), the phase compensating grating 25c is designed such that its grating pitch D' is virtually equal to the grating pitch D of the diffraction grating 25a, and the direction B of its grating lines is orthogonal to the direction C of the grating lines of the diffraction grating 25a. Therefore, in the phase compensating grating 25c, a phase difference contrary to the phase difference that occurred in the diffraction grating 25a, occurs between the TE and TM polarizations. The phase difference that occurred in the diffraction grating 25a is thus compensated.

The phase compensating grating 25c is capable of compensating the phase difference of only one of the zeroth-order diffracted light $L_{40}$ and first-order diffracted light $L_{41}$ produced by the diffraction grating 25a. Here, the grating pitch D' and the groove depth t of the phase compensating grating 25c, are set such that the phase difference of the zeroth-order diffracted light $L_{40}$ used for the detection of information signals, is compensated.

Figure 16:
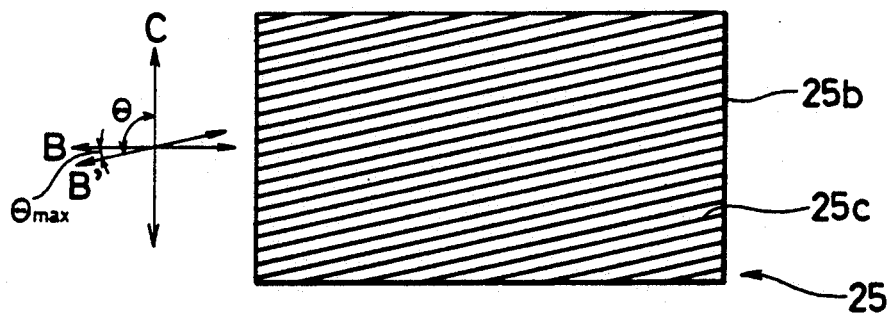

In addition, no diffraction occurs in the phase compensating grating 25c, as the direction B of the grating lines of the phase compensating grating 25c is orthogonal to the direction C of the grating lines of the diffraction grating 25a. No diffraction occurs either even when the direction B' of the grating lines of the phase compensating grating 25c is slightly inclined compared to the direction B, as illustrated in FIG. 16. The maximum angle of deviation $\theta_{max}$ from the direction B that is permissible in the phase compensating grating 25c, is $\theta_{max} = \cos^{-1}(D'/a)$. Accordingly, when $D' = 0.5$ μm and $a = 0.78$ μm, there is obtained $\theta_{max} = 50.1°$. In other words, the angle $\theta$ of the direction B' of the grating lines of the phase compensating grating 25c, and the direction C of the grating lines of the diffraction grating 25a, should be $(90 \pm 50.1)°$.

With the above arrangement, the linearly polarized light $L_1$ that was projected from the semiconductor laser 89, is split by the diffraction grating 25a of the polarization diffraction unit 25 to produce the zeroth-order diffracted light $L_{20}$ and the first-order diffracted light $L_{21}$ that is diffracted at an angle $\beta_1$ and irradiated on the magneto-optical memory element 91 on the recording film 91b across the substrate 91a.

The first-order diffracted light $L_{21}$ that was irradiated on the recording film 91b, is rotated through the magneto-optical effect and is reflected. The reflected light $L_3$ is split by the diffraction grating 25a of the polarization diffraction unit 25, to produce the zeroth-order diffracted light $L_{40}$ and the first-order diffracted light $L_{41}$. At this time, phase differences occur between the TE and TM polarizations contained in the zeroth-order diffracted light $L_{40}$ and in the first-order diffracted light $L_{41}$ respectively.

Thereafter, the zeroth-order diffracted light $L_{40}$ and the first-order diffracted light $L_{41}$ pass through the phase compensating grating 25c, where the phase difference between the TE and TM polarizations contained in the zeroth-order diffracted light $L_{40}$ is compensated. The zeroth-order diffracted light $L_{40}$ is then rotated by 45° by a half-wave plate 92, impinges on the diffraction grating 93a of a diffraction element 93 thereafter and is split into a zeroth-order diffracted light $L_{50}$ that is transmitted, and a first-order diffracted light $L_{51}$ that is diffracted at an angle of diffraction $\beta_1$.

The zeroth-order diffracted light $L_{50}$ and the first-order diffracted light $L_{51}$ are respectively received by photodetectors 94 and 95. Information signals on the magneto-optical memory element 91 are detected by amplifying the output signals of the photodetectors 94 and 95 in a differential amplifier 96. A phase difference occurs between the zeroth-order diffracted light $L_{50}$ and the first-order diffracted light $L_{51}$ in the diffraction grating 93a of the diffraction element 93. However, this phase difference does not affect the quality of the signals.

In the above description, the zeroth-order diffracted light $L_{50}$ and the first-order diffracted light $L_{51}$ produced by the diffraction element 93, were respectively received by the photodetectors 94 and 95, and the detection of information signals was performed by amplifying the output signals of the photodetectors 94 and 95. However, information may be reproduced by means of only one of the zeroth-order diffracted light $L_{50}$ and first-order diffracted light $L_{51}$.

In the above embodiment, the diffraction gratings 25a and 93a and the phase compensating grating 25c, of the polarization diffraction unit 25 and diffraction element 93 are relief type gratings whose cross sections are rectangular profiles. However, these gratings may be of a refractive index modulation type, formed by implanting impurities on the faces of the substrates 25b and 93b.

As described above, a polarization diffraction unit as an optical element in accordance with the present invention is designed such that:

a diffraction grating which grating pitch is approximately equal to the wavelength of the light the diffraction grating is designed for, is formed on one face of a transparent substrate, and a phase compensating grating which grating lines are virtually orthogonal to the grating lines of the above diffraction grating, is formed on the other face of the substrate.

Accordingly, as the phase compensating grating is formed on the face of the substrate opposite to the face whereon the diffraction grating is formed, the phase difference that occurs between different polarizations in the diffraction grating, is compensated by the phase compensating grating. The polarizations are thus in phase when the light emerges from the substrate. Moreover, as the direction of the phase compensating grating is virtually orthogonal to the direction of the diffraction grating, no diffraction occurs in the phase compensating grating.

In addition, as the phase compensating grating is formed on the substrate whereon the diffraction grating is installed, the number of parts does not increase.

On the other hand, an optical pickup device in accordance with the present invention is provided with:

a light source that irradiates a linearly polarized light on a magneto-optical recording medium, photodetectors that receive a reflected light from the magneto-optical recording medium and detect the rotation of the plane of polarization due to the magneto-optical effect, and the above polarization diffraction unit mounted between the magneto-optical recording medium and the photodetectors.

As the optical pickup device comprises the polarization diffraction unit described above, when a linearly polarized light whose plane of polarization was rotated when it was irradiated on the magneto-optical recording medium, is transmitted through or diffracted by the polarization diffraction unit and led to photodetectors, practically no phase difference occurs between the two polarizations in the polarization diffraction unit. As a result, since the light that was led to the photodetectors across the polarization diffraction unit is linearly polarized, information on the magneto-optical recording medium can be accurately reproduced.

Figure 17:
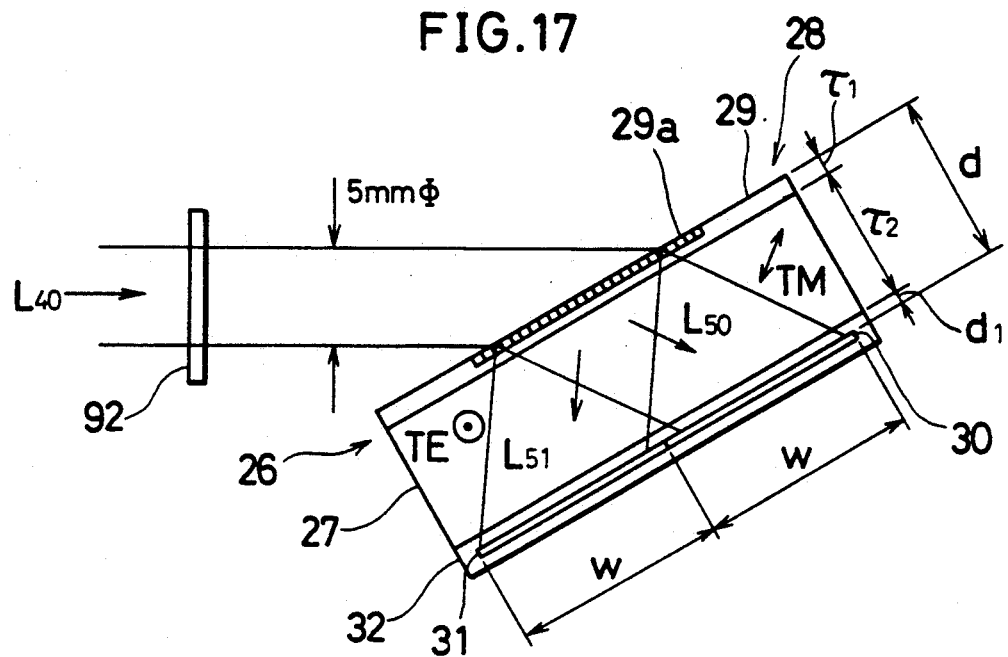
FIG. 17 to FIG. 19 illustrate another embodiment of the present invention.

Another embodiment of the present invention will be described with reference to FIG. 17 to FIG. 19 as well as to FIG. 35.

Figure 19:
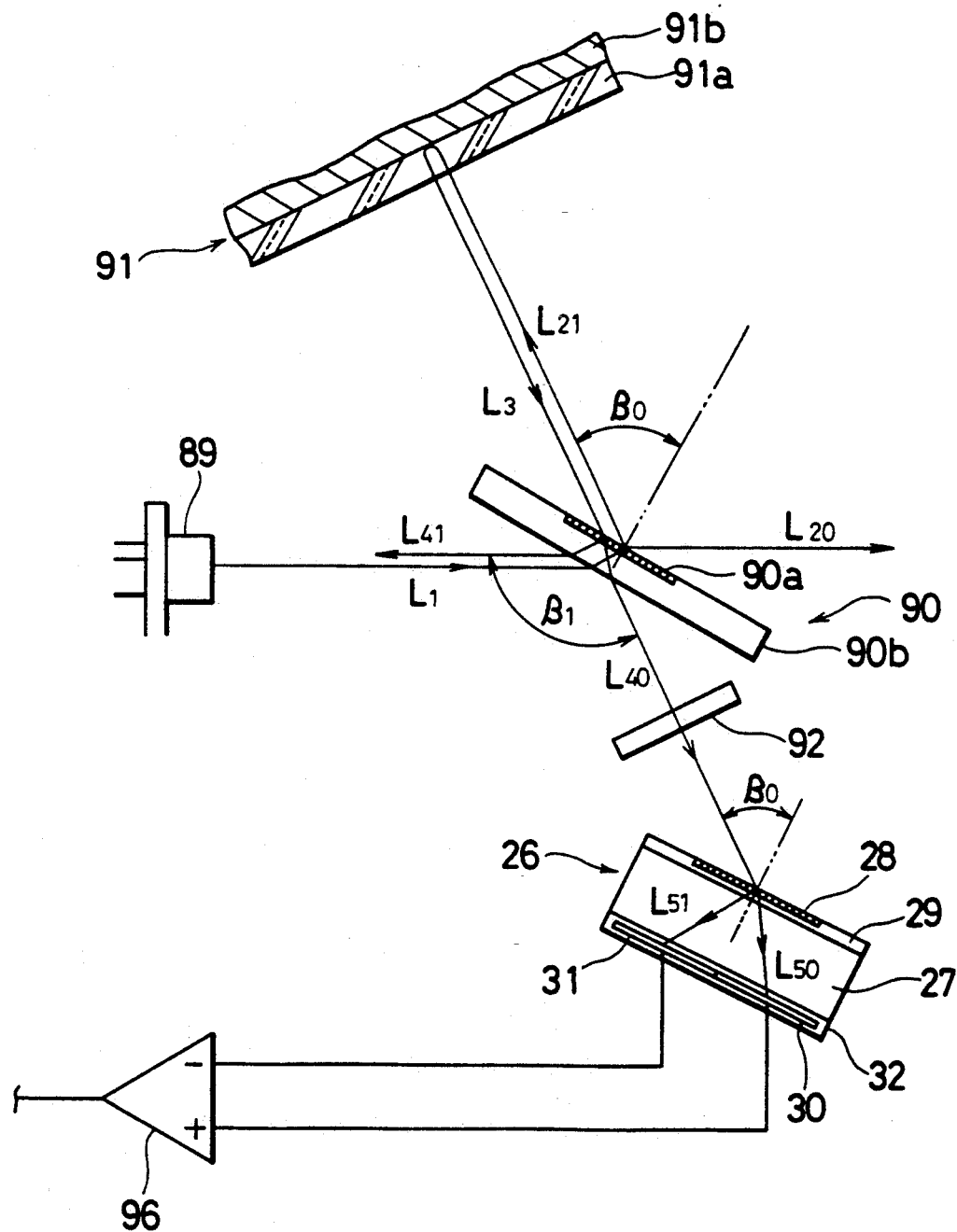

The optical pickup device of the present embodiment is for example provided with a polarized light detecting unit 26, as shown in FIG. 19. This optical pickup device performs the recording and reproduction of information on the magneto-optical memory element 91 as a magneto-optical recording medium, and its main portion is constituted in the same fashion as the optical pickup device shown in FIG. 35. The members having the same configuration as in the optical pickup device of FIG. 35 will be designated by the same reference numerals and redundant description will be omitted.

In the present embodiment, the polarized light detecting unit 26 is installed behind a half-wave plate 92, a as substitute for the diffraction grating 93a and the photodetectors 94 and 95 of FIG. 35. The polarized light detecting unit 26 is provided with a rectangular parallelopiped shaped glass block 27, as illustrated in FIG. 17. A diffraction element 28 that comprises a diffraction grating 29a formed on the face of a glass substrate 29 of a flat plate shape, is fixed on the face of the glass block 27 that faces the half-wave plate 92.

Figure 18:
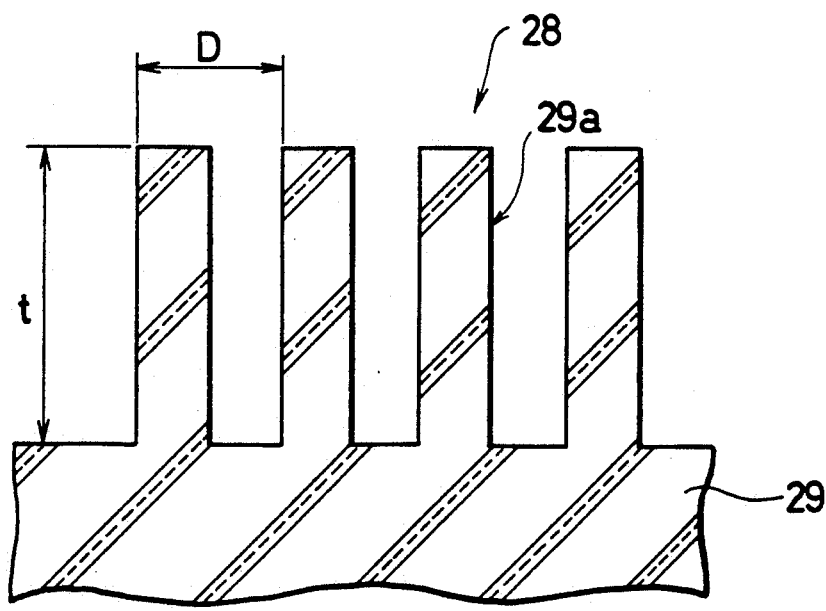

The diffraction grating 29a is for example as illustrated in FIG. 18, of a relief type, has a rectangular cross section, is formed on the face of the glass substrate 29 and has a predetermined grating pitch D and a predetermined groove depth t. The direction of the grating lines of the diffraction grating 29a is orthogonal to the drawing surface of FIG. 17 and FIG. 18, and the grating pitch D is approximately equal to the wavelength $\alpha$ of the light the diffraction grating 29a is designed for, preferably 0.5 to 1 time the wavelength $\alpha$. The groove depth t is set in accordance with the grating pitch D to a value such that a polarization property may be obtained. Here the groove depth t of the grating is set such that a TM polarization contained in a light beam $L_{40}$ coming from the half-wave plate 92, is transmitted through the diffraction element 28 at virtually 100% to produce a zeroth-order diffracted light $L_{50}$, and such that a TE polarization contained in the light beam $L_{40}$ coming from the half-wave plate 92, is diffracted at virtually 100% to produce a first-order diffracted light $L_{51}$. The TM polarization contained in the light beam $L_{40}$ is the polarization whose direction is orthogonal to the grating lines of the diffraction grating 29a, and the TE polarization is the polarization whose direction is parallel with the grating lines of the diffraction grating 29a.

Moreover, the cross section of the above diffraction grating 29a is a rectangular profile. However, it may be a sinusoidal wave profile. In addition, a substrate made of transparent resin may be used instead of the glass substrate 29.

The glass substrate 29 (as well as the glass block 27) is disposed and inclined such that the light beam $L_{40}$ that comes from the half-wave plate 92, impinges on the diffraction element 28 at a Bragg angle $\beta_0$ ($\beta_0 = \sin^{-1}(\alpha/2D)$) (see FIG. 19), where $\alpha$ is the wavelength of the concerned light and D is the grating pitch of the diffraction grating 29a.

A first photodetector 30 and a second photodetector 31 are mounted on the glass block 27 on the face opposite to the face whereon the glass substrate 29 is fixed. The first photodetector 30 and second photodetector 31 are placed side by side, in the same plane and in parallel with the glass substrate 29. The first photodetector 30 and second photodetector 31 are for example encased in a transparent molded resin layer 32 and are bound integrally to the glass block 27. The first photodetector 30 and second photodetector 31 are thus formed integrally with the glass substrate 29. The first photodetector 30 is disposed so as to be capable of receiving the TM polarization, i.e. the zeroth-order diffracted light $L_{50}$ produced by the diffraction grating 29a. On the other hand, the second photodetector 31 is disposed so as to be capable of receiving the TE polarization, i.e. the first-order diffracted light $L_{51}$ produced by the diffraction grating 29a. Electric signals generated in the first photodetector 30 and second photodetector 31, are respectively entered in the different input terminals of a differential amplifier 96 (see FIG. 19).

The thickness $\tau_1$ of the glass substrate 29 is set to for example 1 mm, the thickness $\tau_2$ of the glass block 27 to for example 6.4 mm. The distance $d_1$ between the face of the glass block 27 opposite to the face whereon the glass substrate 29 is fixed, and the light receiving faces of the first photodetector 30 and second photodetector 31, is set to 0.6 mm. In this case, the distance d between the face of the diffraction element 28, and the light receiving faces of the first photodetector 30 and second photodetector 31, is equal to 8 mm. The distance d does not necessarily need to be equal to 8 mm and should be set so as to be approximately within 10 mm. The width w of the first photodetector 30 as well as of the second photodetector 31, is set to 11 mm.

With the above arrangement described in FIG. 17 to FIG. 19, the reproduction of information on the magneto-optical memory element 91 is performed as follows. A laser light $L_1$ is projected from a semiconductor laser 89. A portion of the laser light $L_2$ is diffracted by a diffraction element 90 to produce a first-order diffracted light $L_{21}$ and is irradiated on the magneto-optical memory element 91. A portion of a reflected light $L_3$ from the magneto-optical memory element 91, is transmitted through the diffraction element 90 to produce the zeroth-order diffracted light $L_{40}$, is rotated by 45° by the half-wave plate 92, and impinges on the diffraction element 28, for example as a parallel beam whose diameter is 5 mm$\Phi$.

In the diffraction element 28, the TM polarization contained in the incident light is transmitted at virtually 100% to produce the zeroth-order diffracted light $L_{50}$, due to the polarization property of the diffraction element 28. The transmitted light impinges upon the first photodetector 30. Meanwhile, the TE polarization contained in the incident light is diffracted at virtually 100% to produce the first-order diffracted light $L_{51}$, and impinges upon the second photodetector 31. Information signals on the magneto-optical memory element 91 are detected by amplifying the output signals of the first photodetector 30 and second photodetector 31, in the differential amplifier 96.

In the above arrangement, as the diffraction element 28 and the first photodetector 30 and second photodetector 31 are formed integrally as a polarized light detecting unit 26, the number of parts composing the optical pickup device may be cut down and the optical pickup device can be designed in a compact size.

In addition, as the diffraction element 28 and the second photodetector 31 are placed in close proximity, the first-order diffracted light $L_{51}$ is not likely to slip off the second photodetector 31, even when the angle of diffraction of the first-order diffracted light $L_{51}$ changed in the diffraction element 28, because of a fluctuation in the wavelength of the laser light $L_1$ projected from the semiconductor laser 89.

As described above, an optical pickup device in accordance with the present invention comprises a polarized light detecting unit that is provided with:

a diffraction grating which grating pitch is approximately equal to the wavelength of light the diffraction grating is designed for, that is formed on a transparent substrate, and that separates an incident light into two polarized lights having mutually orthogonal polarizations, a first photodetector that is mounted integrally and virtually in parallel with the substrate, and that receives a zeroth-order diffracted light produced by the diffraction grating, and a second photodetector that is mounted in the same plane as the first photodetector and integrally with the first photodetector and the substrate, and that receives a first-order diffracted light produced by the diffraction grating;

and that is designed such that the distance between the diffraction grating and the first and second diffraction photodetectors, is within 10 mm.

Accordingly, as the diffraction grating having a polarization property, and the first and second photodetectors that receive the different polarized lights are formed integrally, the number of parts may be cut down, and the relative positions of the diffraction grating and the first and second photodetectors can be determined accurately. In addition, as the distance between the diffraction grating and the first and second photodetectors was set such as to be within 10 mm, the overall polarized light detecting unit can be designed in a small size. The optical pickup device that comprises the polarized light detecting unit may be thus formed in a compact size.

Figure 20:
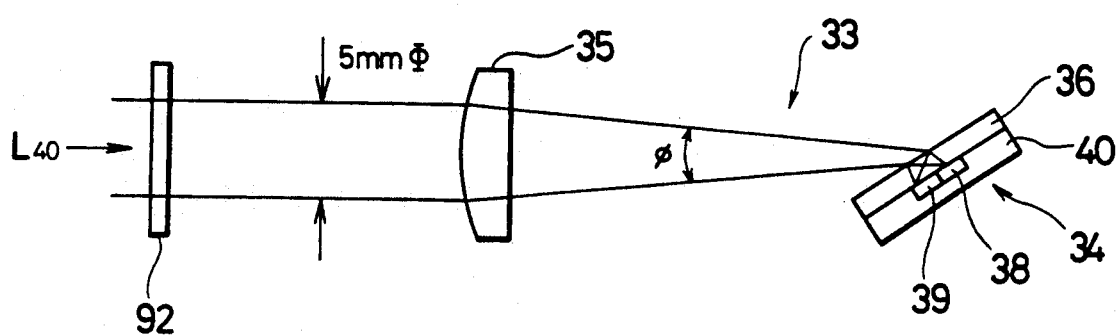
FIG. 20 and FIG. 21 illustrate another embodiment of the present invention.

Another embodiment of the above polarized light detecting unit will be described with reference to FIG. 20 and FIG. 21.

A polarized light detecting unit 33 is incorporated and employed instead of the polarized light detecting unit 26, in the optical pickup device of FIG. 19. As illustrated in FIG. 20, the polarized light detecting unit 33 is provided with a polarized light detecting unit body 34, and a convex lens 35 as a converging means, placed between the polarized light detecting unit body 34 and a half-wave plate 92.

Figure 21:
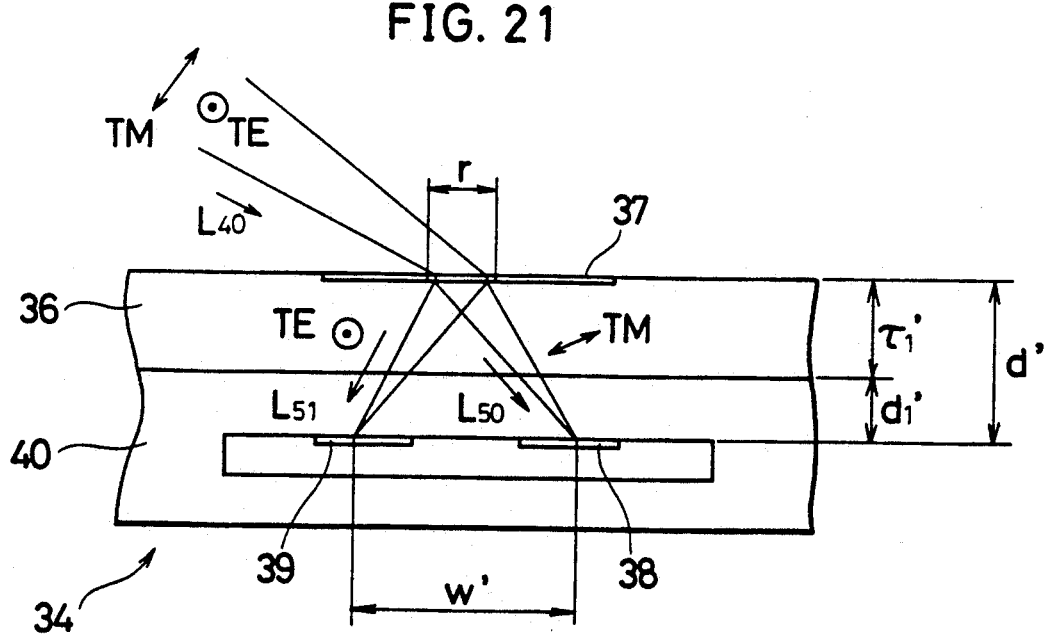

As illustrated in FIG. 21, the polarized light detecting unit body 34 is provided with a glass substrate 36 on the front face of which there is formed a diffraction grating 37. Like the diffraction grating 29a of the previous embodiment, the diffraction direction of the diffraction grating 37 is orthogonal to the drawing surface of FIG. 21. The diffraction grating 37 is given a polarization property such that a TM polarization contained in an incident light beam coming from the convex lens 35 is transmitted at virtually 100% to produce a zeroth-order diffracted light $L_{50}$, and a TE polarization contained in the incident light beam coming from the convex lens 35 is diffracted at virtually 100% to produce a first-order diffracted light $L_{51}$.

On the rear face of the glass substrate 36, a first photodetector 38 and a second photodetector 39 that receive the zeroth-order diffracted light $L_{50}$ and the first-order diffracted light $L_{51}$ respectively, are mounted in the same plane and in parallel with the glass substrate 36. The first photodetector 38 and the second photodetector 39 are encased in a transparent molded resin layer 40, and are bound integrally to the glass substrate 36.

In the above arrangement, the thickness $\tau_1'$ of the glass substrate 36 is for example set to approximately 1 mm, and the distance $d_1'$ between the face of the glass substrate 36 opposite to the face whereon the diffraction grating 37 is formed, and the light receiving faces of the first photodetector 38 and second photodetector 39, is set to approximately 0.6 mm. At this time the distance d' between the diffraction grating 37 and the light receiving faces of the first photodetector 38 and second photodetector 39, equals 1.6 mm.

When the diameter of the parallel beam coming from the half-wave plate 92 equals 5 mmΦ, the convex lens 35 is designed so that its diameter equals for example 6 mmΦ. Provision should preferably be made such that the convergence angle $\phi$ of the converging beam (see FIG. 20) produced by the convex lens 35 is less than 20°. The distance between the convex lens 35 and the diffraction grating 37 is determined such that the light is converged on the photodetectors 38 and 39. At that time, the radius r of the light impinging upon the diffraction grating 37 equals approximately 1.6 mm, and the converging spots on the first photodetector 38 and second photodetector 39 are separated by an interval w' equal to 2.2 mm.

In the present embodiment, the light beam coming from the half-wave plate 92 impinges upon the diffraction grating 37 after being converged by the convex lens 35. As a result, the distance d' from the diffraction grating 37 to the light receiving faces of the first photodetector 38 and second photodetector 39 is reduced to, for example, approximately 1.6 mm. Consequently, the width of the first photodetector 38 and second photodetector 39 can be reduced, and the polarized light detecting unit body 34 can be designed in a size more compact than the polarized light detecting unit 26 of the previous embodiment. Besides, the above distance d' does not necessarily need to be 1.6 mm, but should be approximately within 2 mm.

Figure 22:
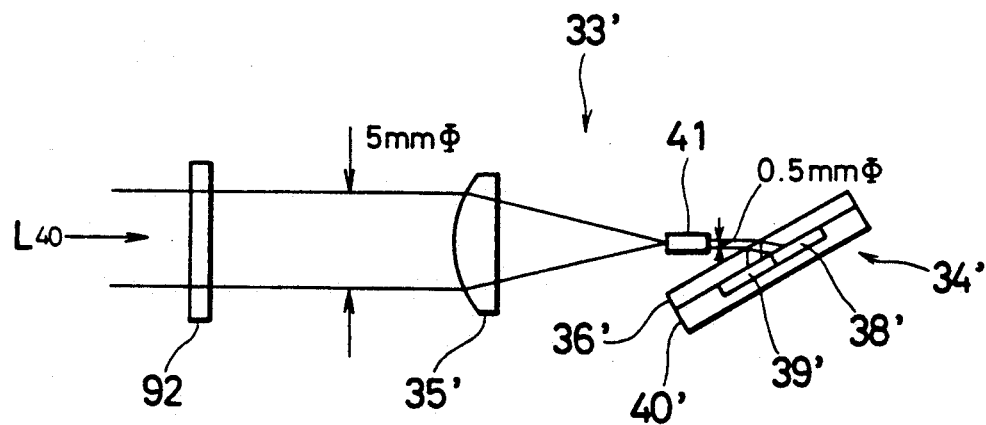
FIG. 22 is a view illustrating the polarized light detecting unit of another embodiment of the present invention.

Further another embodiment of the polarized light detecting unit will be described with reference to FIG. 22.

The present embodiment is a slightly modified form of the previous embodiment, and the members having the same functions than in the previous embodiment, will be designated by like reference numerals with a prime designation and their detailed description will be omitted.

In the present embodiment, a cylindrical SELFOC microlens (refractive index modulation type lens) 41 is disposed between a convex lens 35' as converging means and a polarized light detecting unit body 34'. The light beam that is converged by the convex lens 35' and converted by the SELFOC microlens 41 into a parallel beam of a small radius, and impinges upon a diffraction grating (not illustrated in the figure) formed on a glass substrate 36' in the polarized light detecting unit body 34' thereafter. As a result, the angle of incidence on the diffraction grating is the same for each of the rays composing the light beam. When the diameter of the parallel beam coming from a half-wave plate 92 is equal to 5 mmφ, the diameter of a parallel beam coming from the SELFOC microlens 41 and impinging on the diffraction grating formed on the glass substrate 36', is set to, for example, 0.5 mmφ.

As described above, in the above embodiments of the polarized light detecting units illustrated in FIG. 19 to FIG. 22, the diffraction gratings 29a and 37 are employed in order to split the reflected light from the magneto-optical memory element 91 into two polarized lights having mutually orthogonal polarizations. In addition, the diffraction gratings 29a and 37 are bound integrally to the first and second photodetectors 30 and 31, 38 and 39, and 38' and 39', and the first and second photodetectors 30 and 31, 38 and 39, and 38' and 39' are disposed in the same plane.

Figure 29:
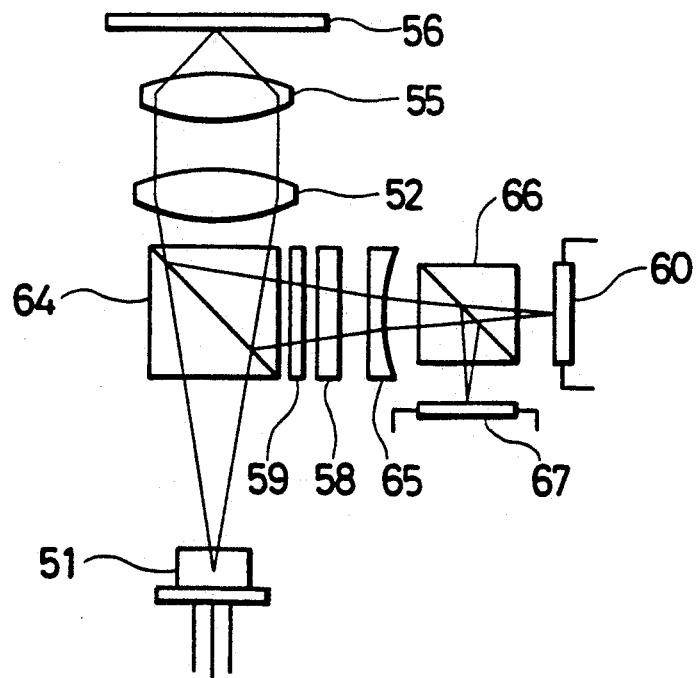

Such an arrangement is difficult to adapt to the conventional polarized light detecting unit that used the polarizing beam splitter 66 (see FIG. 29). Namely, in the conventional optical pickup device shown in FIG. 29, while each of the photodetectors 60 and 67 can be mounted integrally with the polarizing beam splitter 66, they need to be disposed on mutually different faces of the polarizing beam splitter 66. Therefore, the photodetector 60 and the photodetector 67 cannot be formed integrally.

Figure 23:
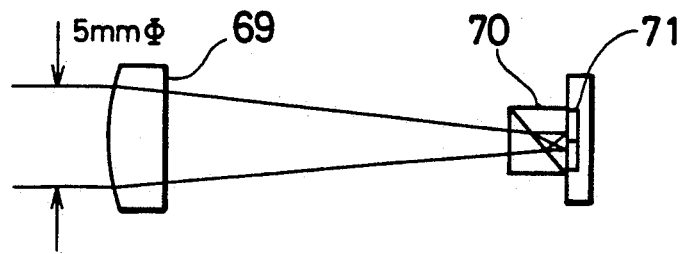
Figure 24B:
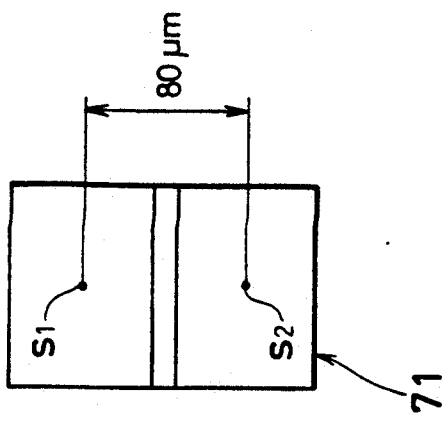
Figure 24A:
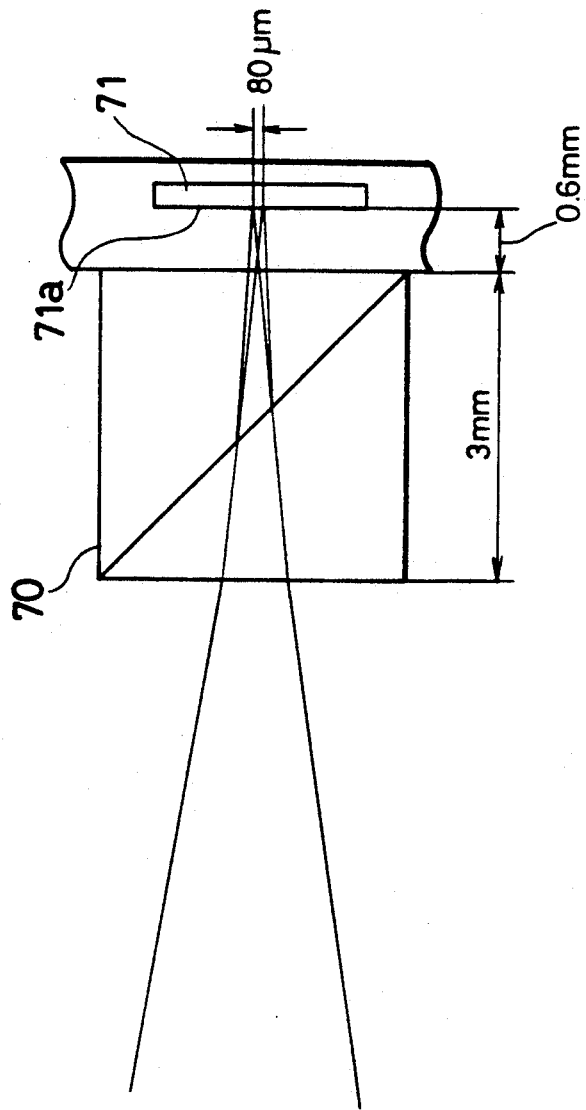
Figure 30:
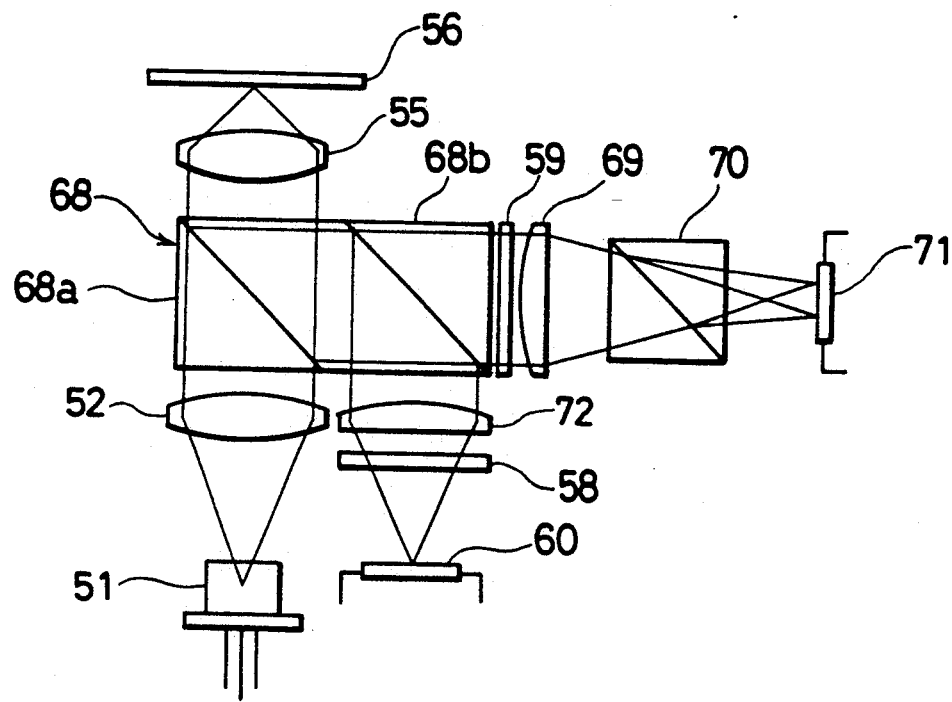
Figure 31:
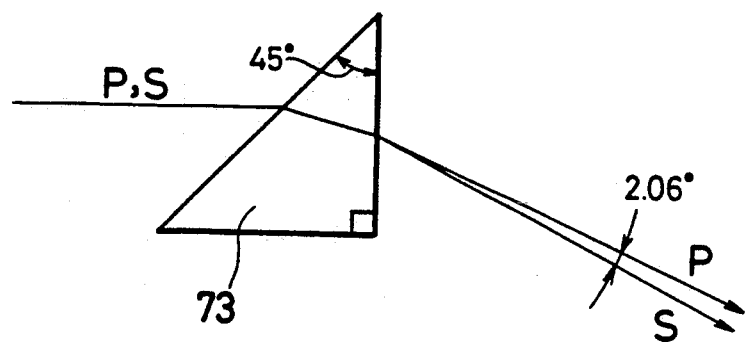
Figure 32:
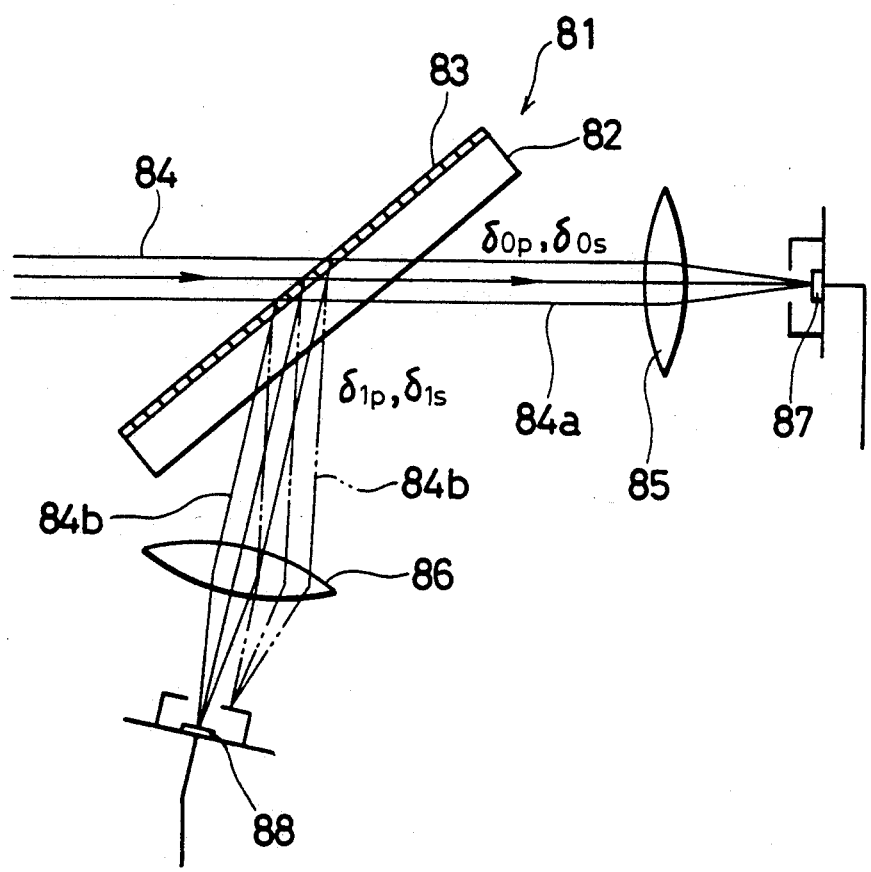

In addition, in the optical pickup device shown in FIG. 30, the Wollaston prism 70 and the photodetector 71 can be formed integrally by designing the optical pickup device such that the reflected light from the magneto-optical memory element 56 which diameter is equal to 5 mmφ, is converged by the convex lens 69 and impinges on the Wollaston prism 70, as illustrated in FIG. 23. In this case, if the length of the side of the Wollaston prism 70 is set so as to be equal to 3 mm, and the distance between the Wollaston prism 70 and the light receiving face of the photodetector 71 is set so as to be equal to 0.6 mm (see FIG. 24(a)), the distance separating two spots $S_1$ and $S_2$ on a light receiving face 71a equals 80 μm (see FIG. 24(b)). However, when the Wollaston prism 70 is used, the consequence of an optical pickup device larger, heavier and which cost is higher than the optical pickup device employing the diffraction grating 29a or 37 as in the above embodiment, cannot be avoided.

Figure 25:
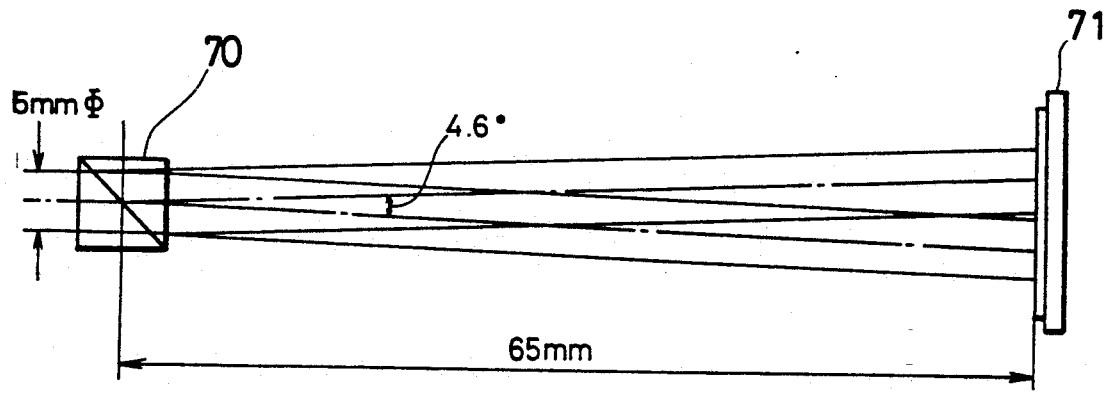
Figure 26:
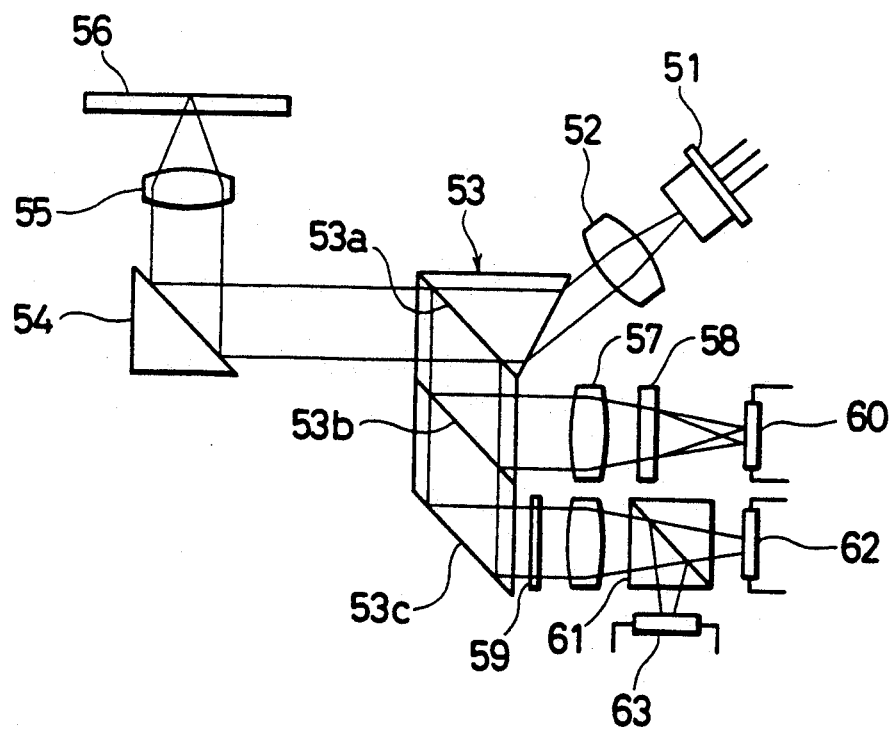
Figure 27:
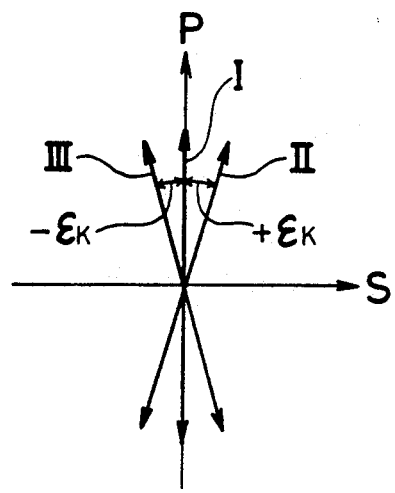
Figure 28:
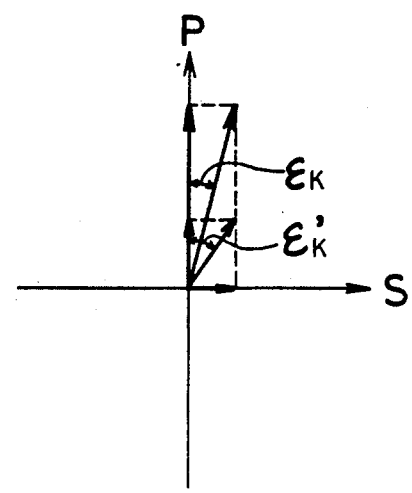

On the other hand, if the convex lens 69 is not disposed before the Wollaston prism 70, as illustrated in FIG. 25, and if the reflected light, having a diameter equal to 5 mmφ, from the magneto-optical memory element 56 remains unchanged when it impinges on the Wollaston prism, the Wollaston prism 70 and the photodetector 71 need to be spaced 65 mm apart. In this case, the Wollaston prism 70 and the photodetector 71 cannot be formed integrally.

As described above, an optical pickup device in accordance with the present invention comprises a polarized light detecting unit that is provided with:

converging means for converting a parallel or diverging beam into a converging beam, a diffraction grating which grating pitch is approximately equal to the wavelength of the light the diffraction grating is designed for, that is formed on a transparent substrate, and that splits an incident light coming from the converging means into different polarized lights having mutually orthogonal polarizations, a first photodetector that is mounted integrally and virtually in parallel with the substrate, and that receives a zeroth-order diffracted light produced by the diffraction grating, and a second photodetector that is mounted in the same plane as the first photodetector and integrally with the first photodetector and the substrate, and that receives a first-order diffracted light produced by the diffraction grating;

and that is designed such that the distance between the diffraction grating and the first and second photodetectors is within 2 mm.

Accordingly, as the converging means is mounted short of the diffraction grating, and a converging beam is made to impinge on the diffraction grating, the distance between the diffraction grating and the first and second photodetectors may be further reduced and set so as to be within 2 mm. As a result, the number of parts may be cut down, and the relative positions of the diffraction grating and the first and second photodetectors can be determined accurately. The polarized light detecting unit as well as the optical pickup device may be thus made smaller and lighter.

The invention being thus described, it will obvious that the same may be varied in many ways. Such variations are not to be regarded as a departure from the scope of the invention.

There are described above novel features which the skilled man will appreciate give rise to advantages. These are each independent aspects of the invention to be covered by the present invention, irrespective of whether or not they are included within the scope of the following claims.

What is claimed is:

1. An optical element comprising:
   a flat, transparent base having a plurality of faces; and
   a diffraction grating, formed on one of said plurality of faces, having grating lines arranged at a grating pitch approximately equal to the wavelength of a light incident to said diffraction grating, said incident light being of a predetermined wavelength,
   said base being a substrate made of a material having an optical anisotropy property,
   a thickness of said substrate being predetermined such that a phase difference between phases of a P polarization and an S polarization contained in said light incident to said diffracting grating, and a phase difference between the phases of said P polarization and said S polarization occurring upon said light propagating through said substrate, cancel out.

2. An optical element as defined in claim 1, wherein the cross section of said grating is formed by recessions and protrusions.

3. An optical element as defined in claim 2, wherein said cross section of said diffraction grating is one of the group consisting of a rectangular profile and a sinusoidal wave profile.

4. An optical element as defined in claim 2, wherein the grating pitch of said diffraction grating ranges from 0.5 to 1 times the predetermined wavelength of the light incident to said grating.

5. An optical element as defined in claim 1, wherein said flat transparent base comprises a substrate made of one of the group consisting of glass and transparent plastic.

6. An optical element as defined in claim 1, wherein said substrate is made of a uniaxial crystal provided with a single optical axis.

7. An optical element as defined in claim 6, wherein said uniaxial crystal is quartz.

8. An optical element as defined in claim 6, wherein said grating lines are formed in parallel with the single optical axis of said substrate.

9. An optical element as defined in claim 1, wherein said diffraction grating is of a refractive index modulation type, that is formed such that an index of refraction of said diffraction grating and an index of refraction of the remaining portion of said substrate, differ.

10. An optical pickup device comprising:
    a light source for irradiating light;
    a magneto-optical recording medium, receiving said irradiated light, for reflecting said irradiated light through an optical element to a photodetector; and
    a photodetector for receiving and detecting the reflected light from said magneto-optical recording medium and detecting the recording signals of said magneto-optical recording medium based on the Kerr angle of rotation,
    said optical element including,
    a flat, transparent base having a plurality of faces,
    a diffraction grating, formed on one of said plurality of faces, having grating lines arranged at a grating pitch approximately equal to the wavelength of a light incident to said diffraction grating, said incident light being of a predetermined wavelength, and
    said base being a substitute made of a material having an optical anisotropy property,
    a thickness of said substrate being predetermined such that a phase difference between phases of a P polarization and of an S polarization contained in said light incident to said diffraction grating, and a phase difference between the phases of said P polarization and said S polarization occurring upon said light propagating through said substrate, cancel out.

11. An optical element comprising:
a flat, transparent base having a plurality of faces;
a first diffraction grating, formed on one of said plurality of faces, having grating lines arranged at a grating pitch approximately equal to the wavelength of a light incident to said diffraction grating, said incident light being of a predetermined wavelength; and
a second diffraction grating, formed on one of said plurality of faces different from that of said diffraction grating,
said first diffraction grating and second diffraction grating being formed such that the grating pitch of the first diffraction grating and a grating pitch of the second diffraction grating are equal, and such that the grating lines of the first diffraction grating and the grating lines of the second diffraction grating are parallel with each other.

12. An optical element comprising:
a flat, transparent base having a plurality of faces;
a diffraction grating, formed on one of said plurality of faces, having grating lines arranged at a grating pitch is approximately equal to the wavelength of a light incident to said diffraction grating, said incident light being of a predetermined wavelength; and
a phase compensating grating, formed on one of said plurality of faces different from that of said diffraction grating, having grating lines substantially orthogonal to the grating lines of the diffraction grating.

13. An optical pickup device comprising:
a light source for irradiating light;
a magneto-optical recording medium, receiving said irradiated light, for reflecting said irradiated light through an optical element to a photodetector; and
a photodetector for receiving and detecting the reflected light from said magneto-optical recording medium,
said optical element including,
a flat, transparent base having a plurality of faces,
a diffraction grating, formed on one of said plurality of faces, having grating lines arranged at a grating pitch approximately equal to the wavelength of a light incident to said diffraction grating, said incident light being of a predetermined wavelength, and
a phase compensating grating, formed on one of said plurality of faces different from that said diffraction grating, having grating lines substantially orthogonal to the grating lines of the diffraction grating.

14. An optical element comprising:
a flat, transparent base with an index of refraction n; and
a grating, formed on said flat, transparent base, having a grating pitcha A approximately equal to the wavelength $\alpha$ of a light incident to said grating, said incident light being of a predetermined wavelength, wherein the index of refraction n of said flat, transparent base, the wavelength $\alpha$ of the incident light, and the grating pitch A of said grating, satisfy the equation, $$A \leq \alpha/n.$$

15. An optical element as defined in claim 14, wherein a cross section of said grating is formed by recessions and protrusions.

16. An optical element as defined in claim 15, wherein a cross section of said grating is one of a rectangular profile and a sinusoidal wave profile.

17. An optical element comprising a phase shifting element which comprises a flat, transparent base with an index of refraction n; and grating, formed on said flat transparent base, having a grating pitch A approximately equal to the wavelength $\alpha$ of a light incident to said grating, said incident light being of a predetermined wavelength, wherein the index of refraction n of said flat transparent base, the wavelength $\alpha$ of the incident light, and the grating pitch A of said grating, satisfy the equation, $$A \leq \alpha/n,$$

said phase shifting element being for controlling a relative phase difference between a polarization parallel with the grating lines of said grating, and a polarization orthogonal to the grating lines of said grating.

18. An optical element as defined in claim 17, wherein said flat transparent base comprises a substrate made of one of glass and transparent plastic.

19. An optical element comprising an antireflection element which comprises a flat, transparent base having a plurality of faces and with an index of refraction n; and a grating, formed on one of said plurality of faces opposite to a face whereon an incident light falls, having a grating pitch A approximately equal to the wavelength $\alpha$ of said light incident to said grating, said incident light being of a predetermined wavelength, wherein the wavelength $\alpha$ of the incident light, and the grating pitch A of said grating, satisfy the equation, $$A \leq \alpha n.$$

20. A polarized light detecting unit comprising:
a transparent substrate;
a diffraction grating, formed on said transparent substrate, having a grating pitch approximately equal to the wavelength of a light incident to said diffraction grating, said incident light being of a predetermined wavelength for separating said incident light into two polarized lights having mutuallly orthogonal polarizations;
a first photodetector, mounted integrally and substantially in parallel with said substrate, for receiving a zeroth-order diffracted light produced by said separation of incident light by said diffraction grating; and
a second photodetector, located in the same plane as said first photodetector and mounted integrally with said first photodetector and said substrate, for receiving a first-order diffracted light produced by said separation of incident light by said diffraction grating, wherein the distance between said diffraction grating and said first and second photodetectors is no more than 10 mm.

21. A polarized light detecting unit as defined in claim 20, wherein the distance between said diffraction grating and said first and second photodetectors is set so as to be within 10 mm.

22. A polarized light detecting unit as defined in claim 20 further comprising:
converging means for converging said zeroth-order diffraction light to said first photodetector and for converging said first-order diffracted light to said second photodetector, wherein the distance between said diffraction grating and said first and second photodetectors is no more than 2 mm.

23. A polarized light detecting unit as defined in claim 22, wherein a convergence angle of a converged output of said converging means is less than 20°.

24. A polarized light detecting unit as defined in claim 22, wherein said converging means comprises a convex lens.

25. A polarized light detecting unit as defined in claim 22, wherein said grating pitch of said diffraction grating ranges from 0.5 to 1 times the predetermined wavelength of the light incident to said diffraction grating.

26. A polarized light detecting unit as defined in claim 20, wherein said diffraction grating is a relief type diffraction grating which is formed by recessions and protrusions.

27. A polarized light detecting unit as defined in claim 26, wherein a cross section of said diffraction grating is one of a rectangular profile and a sinusoidal wave profile.

28. A polarized light detecting unit as defined in claim 20, wherein the said substrate is made of a selected one of the group consisting of glass and plastic.

29. A polarized light detecting unit as defined in claim 20, wherein said first and second photodetectors are formed directly on the face of said substrate opposite to the face whereon said diffraction grating is formed.

30. A polarized light detecting element as defined in claim 20, wherein said polarized light detecting element is used in an optical pickup device.

* * * * *